(12) United States Patent
Ellison

(10) Patent No.: US 10,217,133 B2
(45) Date of Patent: Feb. 26, 2019

(54) REVERSE SHOWROOMING AND MERCHANT-CUSTOMER ENGAGEMENT SYSTEM

(71) Applicant: PAYPAL, INC., San Jose, CA (US)

(72) Inventor: Scott Ellison, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 455 days.

(21) Appl. No.: 13/946,575

(22) Filed: Jul. 19, 2013

(65) Prior Publication Data

US 2015/0025967 A1    Jan. 22, 2015

(51) Int. Cl.
    *G06Q 30/02*    (2012.01)

(52) U.S. Cl.
    CPC ..... *G06Q 30/0261* (2013.01); *G06Q 30/0267* (2013.01)

(58) Field of Classification Search
    CPC ........................................... G06Q 30/00
    USPC .................................. 705/14.58, 26.9, 27.2
    See application file for complete search history.

(56) References Cited

U.S. PATENT DOCUMENTS

| 7,406,437 | B2 | 7/2008 | Goodwin, III |
| 7,739,157 | B2* | 6/2010 | Bonner et al. ............... 705/26.9 |
| 8,326,700 | B1 | 12/2012 | Laufer et al. |
| 8,380,586 | B2* | 2/2013 | Paolini ......................... 705/27.2 |
| 2002/0165778 | A1* | 11/2002 | O'Hagan et al. ............... 705/14 |
| 2009/0276289 | A1 | 11/2009 | Dickinson et al. |
| 2010/0094681 | A1* | 4/2010 | Almen et al. .................... 705/10 |
| 2011/0246306 | A1* | 10/2011 | Blackhurst et al. ....... 705/14.58 |
| 2013/0103482 | A1 | 4/2013 | Song et al. |
| 2014/0164282 | A1 | 6/2014 | Asbury |
| 2015/0026010 | A1 | 1/2015 | Ellison |

OTHER PUBLICATIONS

International Search Report dated Nov. 14, 2014 in PCT Patent Application No. PCT/US2014/46666, 3 pages.
Non-Final Office Action dated Jul. 29, 2016 in U.S. Appl. No. 13/945,670, filed Jul. 18, 2013, 14 pages.
Response to Non-Final Office Action dated Jul. 29, 2016 in U.S. Appl. No. 13/945,670, filed Jul. 18, 2013, 13 pages.

* cited by examiner

*Primary Examiner* — Marilyn G Macasiano
(74) *Attorney, Agent, or Firm* — Haynes and Boone, LLP

(57) ABSTRACT

Systems and methods for providing a merchant-customer engagement system include a physical merchant location in which a customer may be tracked to determine products within the physical merchant location that the customer is interested in. A merchant may use a wearable merchant device that is configured to identify the customer via a camera that captures an image of the customer, and that image may be used to retrieve customer account information for that customer. Using the customer account information and the products that the customer is showing interest in, the wearable merchant device may be used to display merchant-customer engagement information next to a view of the customer to allow the merchant to help the customer while utilizing a variety of displayed information about the customer including, for example, past purchases, products browsed in-store and previously browsed online, time spent in an area of the physical merchant location, etc.

20 Claims, 19 Drawing Sheets

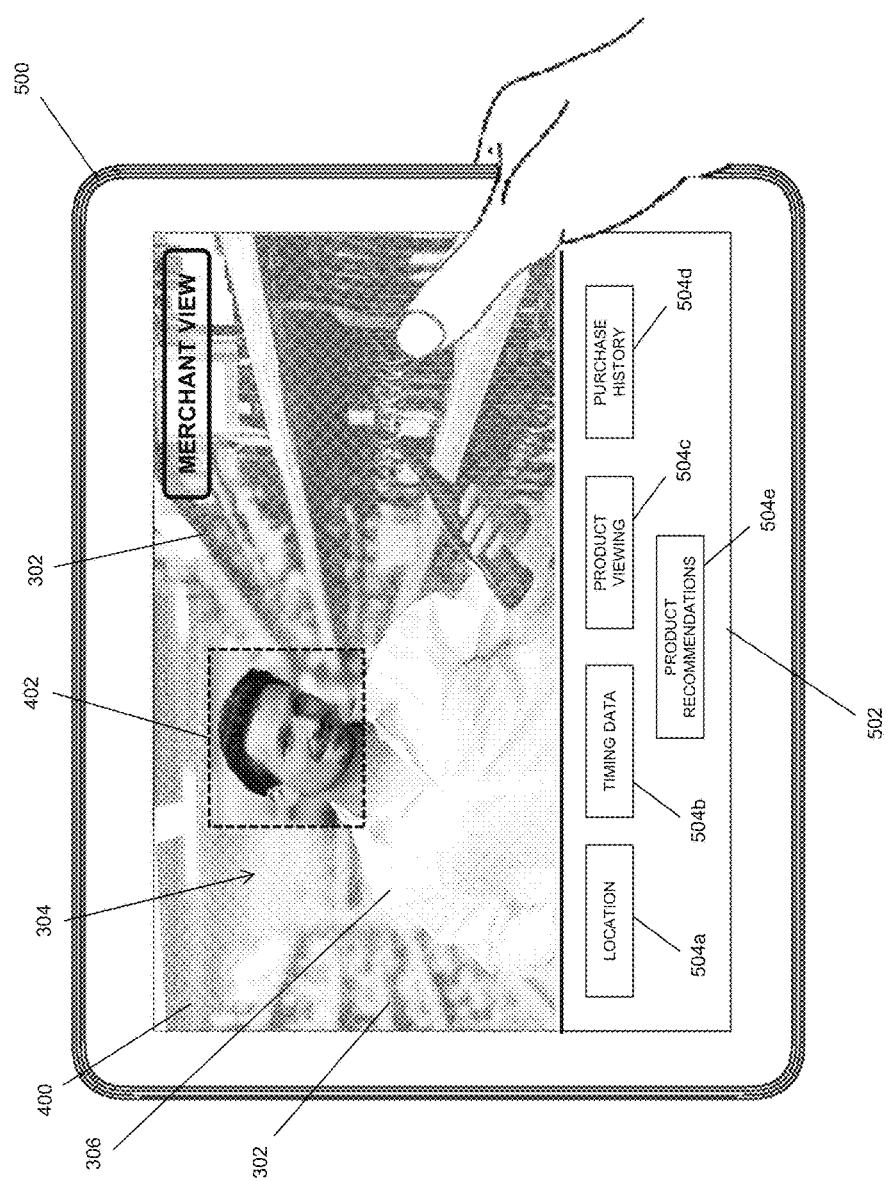

REVERSE SHOWROOMING AND MERCHANT-CUSTOMER ENGAGEMENT SYSTEM

CROSS-REFERENCE TO RELATED APPLICATION

This application is related to United States patent application, filed on Jul. 18, 2013 and entitled "Reverse Showrooming And Merchant-Customer Engagement System" Ser. No. 13/945,670. The entire content of the above-identified application is incorporated herein by reference.

BACKGROUND

Field of the Invention

The present invention generally relates to online and/or mobile payments and more particularly to a reverse showrooming and merchant-customer engagement system that may be used with online and/or mobile payment systems.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

A growing trend at physical merchant locations, sometimes referred to as "show-rooming", involves customers visiting a first merchant's physical location to view and/or try out products offered by a first merchant. However, rather than purchasing those products, "show-rooming" customers will typically then research the price of those products online (e.g., after leaving the first merchant's physical location, at the first merchant's physical location on a mobile device, etc.), and end up purchasing the product from a second, different merchant (e.g., at a physical or online location.) Such activities result in lost sales for merchant's with physical locations, which can be particularly damaging when those sales are lost to online merchants with lower overhead due to the lack of operating a physical location.

Thus, there is a need for improved merchant-customer engagement systems and methods that increase the chance of customers making a purchase at merchant physical locations.

BRIEF DESCRIPTION OF THE FIGURES

FIG. 5 is a front view illustrating an embodiment of a customer detection screen view of the customer of FIG. 3 through a mobile merchant device;

Figure 1:
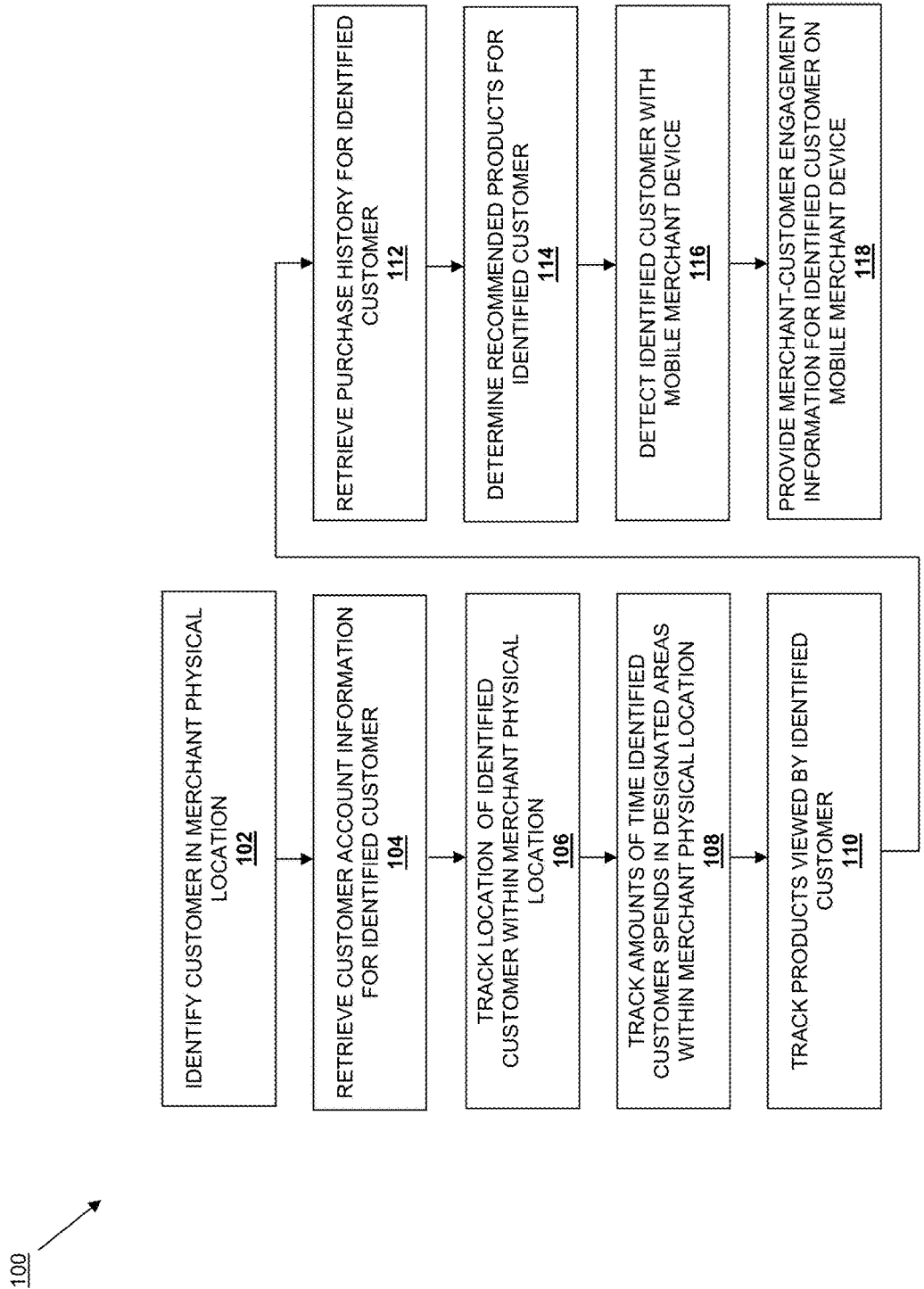
FIG. 1 is a flow chart illustrating an embodiment of a method for providing merchant-customer engagement.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for helping customers at merchant physical locations. Such systems and methods may be utilized to provide a merchant or merchant employee (hereinafter, a "merchant") a variety of information about a customer that they are helping so that a purchase by that customer may be facilitated. In some embodiments, the customer may be detected entering the merchant physical location, and a wide variety of actions performed by that customer within the physical location may be tracked. For example, the location of the customer within the merchant physical location, the amount of time the customer spends in different or designated areas in the merchant physical location, the products the customer handles, views, or otherwise interacts with, and/or a variety of other customer actions within the merchant physical location may be detected, tracked, and/or otherwise monitored. Furthermore, in some embodiments, previous purchases made by the customer may be retrieved. In many embodiments, the merchant is provided a mobile merchant device for use in helping the customer, and when the merchant approaches the customer, any information tracked, monitored, retrieved, or otherwise determined may be displayed as merchant-customer engagement information on the merchant mobile device so that the merchant may leverage that information to help the customer. For example, using information such as time spent in designation locations in the merchant physical location, products handled or viewed, and previous purchases, product recommendations may be determined and displayed on the merchant mobile device so that the merchant may recommend those products to the customer. In some embodiments, the merchant mobile device may be a wearable mobile device that can display the merchant-customer engagement information adjacent the merchant's view of the customer such that any help from the merchant provided using the merchant-customer engagement information will occur in a seamless manner.

Figure 2:
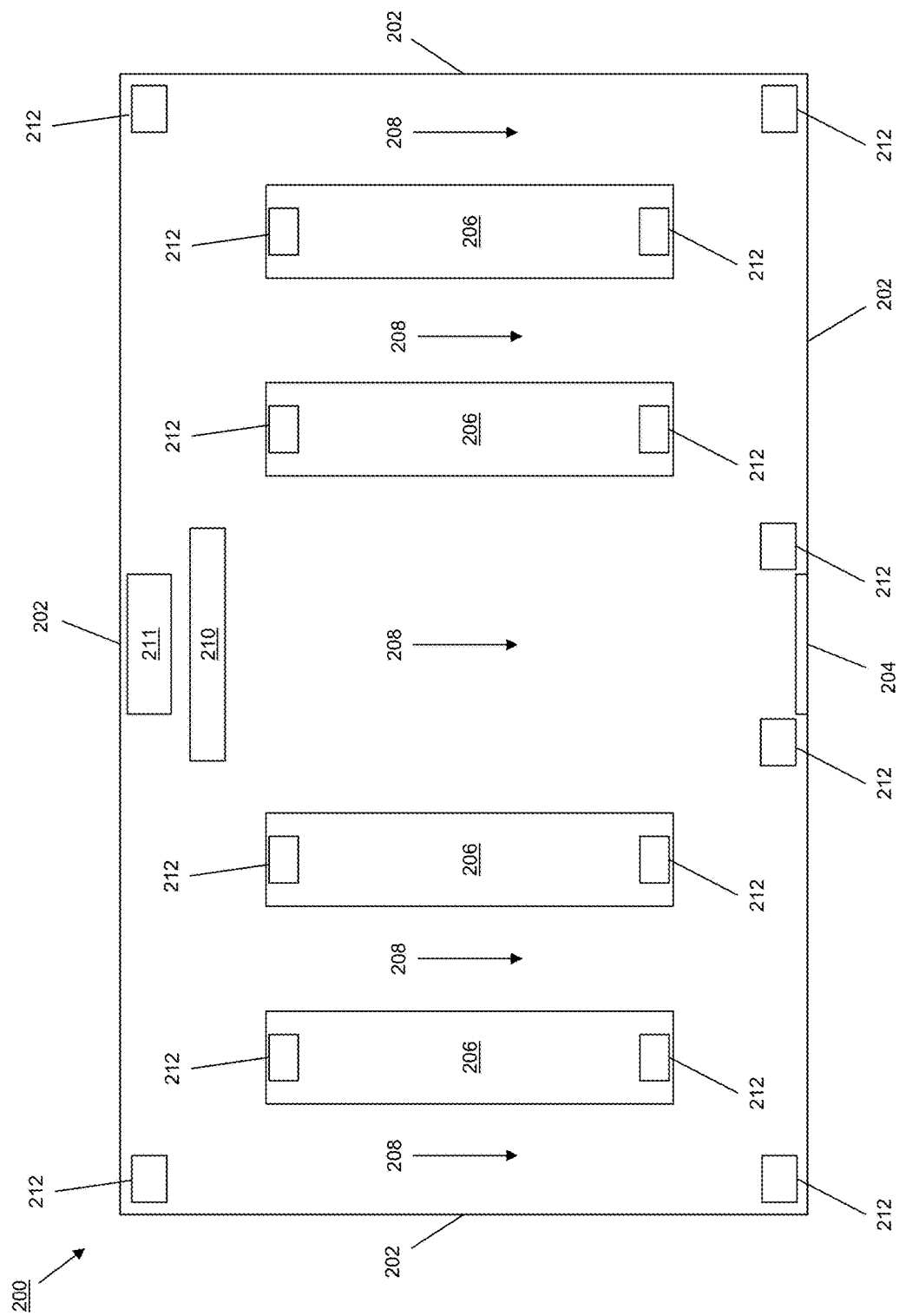
FIG. 2 is a schematic view illustrating a merchant physical location.

Referring now to FIGS. 1 and 2, embodiments of a method 100 and system 200 for providing merchant-customer engagement are illustrated. While the embodiment of the system 200 illustrated and discussed below is directed to a "brick and mortar" merchant physical location, other types of merchant physical locations such as, for example, mobile merchant locations, temporary merchant locations, and/or a variety of other merchant locations known in the art may benefit from the systems and methods taught herein. Furthermore, while the embodiment of the method 100 illustrated and discussed below includes a plurality of method blocks performed in a specific order, some of those blocks may be optional and/or not performed in different embodiments, or may be performed at different times or in a different order than presented herein. Thus, one of skill in the art in possession of the present disclosure will recognize that a wide variety of modification to the specific embodiments illustrated and discussed herein will fall within the scope of the present disclosure.

Referring now to FIG. 2, an embodiment of a physical merchant location 200 is illustrated. The physical merchant location 200 of FIG. 2 is a simplified schematic provided for clarity of illustration and discussion that includes a plurality of walls 202 that define the merchant physical location 200 between them, along with an entrance 204 that provides access to the merchant physical location 200. A plurality of product areas 206 are located in the merchant physical location 200 and define a plurality of aisles 208 between them. A checkout area 210 is provided in the merchant physical location 200 as a merchant or merchant employee central location and, in some situations, to allow for customers to pay for products. However, mobile payment systems (e.g., the mobile merchant devices discussed below) may allow for customers to pay for products anywhere in the merchant physical location 200.

In the illustrated embodiment, a system provider device 211 is included in the merchant physical location 200 and may be operated by the merchant associated with the merchant physical location 200 in order to provide the merchant-customer engagement system described herein. However, the system provider device 211 may also be a computing system that is connected through a network to a system provider device that helps provides the merchant-customer engagement system described herein. In some embodiments, a plurality of sensors 212 are positioned around the merchant physical location 200 and may be coupled to the system provider device 211 to enable the tracking and monitoring of customers within the merchant physical location 200 as discussed below. The sensors 212 may include cameras, Near Field Communication (NFC) devices, Radio Frequency Identification (RFID) devices, location tracking devices (e.g., Global Positioning System (GPS) device, micro-GPS devices, Wifi devices, etc.), and/or any other sensor known in the art that may be used to provide the customer tracking and monitoring functionality discussed below. In addition, products located in the product areas 206 may also include devices for communicating with the system provider device 211, customer devices, and/or other devices utilized in the merchant-customer engagement system.

In an embodiment, the method 100 begins at block 102 where a customer is identified in a merchant physical location. In one embodiment of block 102 the customer may be identified as that customer enters the physical merchant location 200. However, in other embodiments, the customer may be identified at designated locations within the merchant physical location 200, upon viewing or otherwise interacting with a product in the merchant physical location 200, upon interacting with a merchant through a mobile merchant device, discussed below, and/or at any time or in response to any other customer action known in the art. In some embodiments, any of the sensors 212 in the merchant physical location 200 may interact with the customer or a customer device of the customer in order to identify the customer entering the merchant physical location 200.

For example, the customer may include a customer device that includes a "check-in" application (e.g., the Foursquare™ application available from Foursquare Labs, Inc. of New York City, N.Y.), and at block 102 the customer may use the check-in application to check into the merchant physical location 200 by sending information from the customer device over a network (e.g., the Internet) to a check-in application provider. The system provider device 211 may then operate to identify the customer entering the merchant physical location 200 after communicating with the check-in application provider about the customer check in at the merchant physical location 200. Information retrieved from the check-in application provider may include a customer identity, a customer device identifier, NFC communication information associated with the customer device, RFID information associated with the customer device, an image of the customer associated with the customer device, and/or a variety of other information known in the art that identifies the customer and that may allow the customer to be tracked and/or monitored in the merchant physical location 200 as discussed below.

In another example, the customer may use the customer device at block 102 to join a wireless network (e.g., a WiFi network, a Bluetooth network, etc.) provided in the merchant physical location 200, and the joining of that network will cause the system provider device 211 to identify that customer. The joining of the network using the customer device may result in the automatic retrieval of (or request for the provision of) customer information that identifies the customer or customer device of that customer and that may allow the customer to be tracked and/or monitored in the merchant physical location 200 as discussed below.

In another example, any of the sensors 212 (e.g., the sensors 212 on either side of the entrance 204) may communicate with a customer device of the customer to identify the customer entreating the merchant physical location 200 at block 102. In such examples, the customer device may include an NFC or RFID system that interacts with the sensors 212 to communicate customer information that identifies the customer or the customer device of the customer and that may allow the customer to be tracked and/or monitored in the merchant physical location 200 as discussed below.

In another example, the sensors may include cameras that capture an image of the customer entering the merchant physical location 200 and provide that image to the system provider device 211. At block 102, the image captured of the customer entering the merchant physical location 200 may be analyzed and checked against a database of customer images using facial recognition techniques to identify the customer.

While a few examples have been provided, one of skill in the art in possession of the present disclosure will recognize that a variety of other systems, methods, and/or techniques for identifying a customer at a physical location will fall within the scope of the present disclosure. More technically complicated embodiments may involve the provision of customer device GPS information to a third party tracking system that informs the system provider device 211 when the customer is near or within the merchant physical location 200, while less technically complicated embodiments may include the merchant at the merchant physical location 200 asking the customer for identifying information as they enter the merchant physical location 200, or handing the customer a tracking unit that may be used to track the customer through the merchant physical location 200 as discussed below. Furthermore, the provision of customer identification information from the customer to the merchant-customer engagement system provider device may include scanning a card (e.g., via a magnetic scanning system) provided by the customer, scanning a Quick Response (QR) code (via an optical scanning system) displayed by customer device of the customer, reading a fingerprint or other biometric identification (via a biometric identification system) of the customer, etc. As such, the present disclosure is not meant to be limited to the customer identification techniques explicitly described herein.

Thus, the customer entering the merchant physical location 200 at block 102 may be identified by a name, a customer account number, a customer device identifier (e.g., a phone number, an Internet Protocol (IP) address, etc.), a customer image (e.g., a facial image), a customer biometric identification (e.g., finger print), a customer address, and/or a variety of other customer identification information known in the art.

The method 100 then proceeds to block 104 where customer account information for the identified customer is retrieved. In some embodiments, a customer account may have previously been associated with the customer identified at block 102 in a database accessible by the system provider device 211. For example, the customer may have previously opened a payment account (e.g., a credit account) with the merchant or other system provider associated with the physical merchant location 200. In another example, the merchant or other system provider associated with the physical merchant location 200 may have associated a customer tracking account (e.g., an account used to associate the identity of a customer with that customers actions in the merchant physical location 200) with the customer on a previous visit of that customer to the merchant physical location 200. In another example, the customer may have a payment account provided by a payment account provider or payment service provider such as, for example, PayPal Inc. of San Jose, Calif. Thus, customer account information for a variety of different customer accounts may be retrieved at block 104, including accounts associated with the merchant physical location 200, accounts unassociated with the merchant physical location 200, payment accounts, non-payment tracking accounts, and/or a variety of other customer accounts known in the art.

Furthermore, customer accounts may be created "on-the-fly" for customers that are identified at block 102 but that are previously unknown to the system. In an embodiment, identification of a customer at block 102 may include receiving some distinguishing information from a customer that was previously unknown to the system, such as a name, address, email address, image, customer device identifier, and/or a variety of other customer identification information known in the art. In such embodiments, the retrieval of customer account information at block 104 may occur as a result of the creating of a customer account for that previously unknown customer. For example, at block 102 the customer entering the merchant physical location 200 may be identified by capturing an image of the customer, retrieving a customer device identifier from a customer device of the customer, receiving a name, address, or email address of the customer, etc. At subsequent block 104, retrieval of the customer account information may include the system provider device 211 creating a customer account for that customer. Thus, customer account information may be retrieved from existing customer accounts, or customer accounts may be created, in order to allow tracking and monitoring information about those customers to be associated with those customers for use later in the method 100, discussed below.

In an embodiment, the customer account information retrieved at block 104 may be as simple as an account number with which to associated the tracking and monitoring information discussed below with reference to blocks 106, 108, and 110. In other embodiments, the customer account information retrieved at block 104 may include previous tracking and monitoring information, previous purchases made by the identified customer, access information to other accounts held by the identified customer (e.g., such information may provide access to a plurality of different payment accounts), previous images provided by or taken of the customer, and/or a variety of other customer account information known in the art.

The method 100 then proceeds to block 106 where the location of the identified customer is tracked within the merchant physical location 200. In an embodiment of block 106, the customer may be tracked throughout the physical merchant location 200 using the sensors 212, a customer device of the customer, combinations thereof, and/or using a variety of other tracking components known in the art. For example, the customer device and the sensors 212 may include NFC or RFID functionality that allows for communication between the customer device and sensors 212 as well as the determination of the proximity of the customer device to one or more of the sensors 212 (e.g., based on signal strength or other communication factors.) In another embodiment, the customer device and/or sensors 212 may provide a GPS, micro-GPS, or other location determination system that allow for the tracking and/or monitoring of the location of the customer throughout the merchant physical location 200. In another embodiment, the sensors may include cameras that take images and/or video of the customer as that customer moves throughout the merchant physical location 200, and those images and/or video may be provided to the system provider device 211 for recognition processing to track and/or monitor the location of the customer anywhere within the merchant physical location 200.

The tracking of the location of the customer within the merchant physical location 200 at block 106 may include the collection and storage (e.g., in the database accessible by the system provider device 211 and in association with the customer account retrieved at block 104) of a variety of different information describing the customer actions in the merchant physical location 200. For example, such information may include details of how the customer moved through the merchant physical location 200 including, but not limited to, physical coordinates of the customer within the merchant physical location 200, acceleration or velocity of the customer between particular areas within the merchant physical location, and/or any other location tracking information known in the art. In a specific example, upon entering the merchant physical location 200 the customer may be tracked moving through one or more of the aisles 208, stopping in an aisle at a particular location adjacent a product area 206, moving quickly towards a different product area 206, wandering up and down the same aisle 208, etc. Any information that results from the tracking and monitoring at block 106 may be stored by the system provider device 211 in a database in association with the customer account retrieved at block 104.

The method 100 then proceeds to block 108 where the amount of time the identified customer spends in designated areas within the merchant physical location are tracked. In an embodiment, as the customer moves through the merchant physical location 200 (and during the tracking of the location of that customer), timing data associated with those movements may be captured by the system provider device 211. For example, timing data may be captured and stored about the customer that details how long that customer may stop in an aisle 208 at a particular location adjacent a product area 206, how quickly that customer may move towards a different product area 206, how long that customer may wander up and down the same aisle 208, how long that customer has been in the merchant physical location 200, etc. Any timing data captured at block 106 may be stored by the system provider device 211 in a database in association with the customer account retrieved at block 104

The method 100 then proceeds to block 110 where products viewed by the identified customer are tracked. In an embodiment, the merchant physical location 200 may include one of a variety of systems that may include one or more of the sensors 212, the customer device of the customer, and the products located in the product areas 210, and those systems are configured to allow the products viewed by the customer while in the merchant physical location 200 to be tracked. In one embodiment, the merchant-customer engagement system provider device may use the location tracking performed at block 106 and the time data tracked at block 108 to infer when the customer has viewed a product located in a product area 206. For example, a customer stopping in an aisle 208 for a particular length of time next to a particular portion of a product area 206 may be inferred to be viewing the product located in that product area 206 (e.g., particularly when the product is relatively large, such as in the case of an appliance like a refrigerator or washing machine). In such embodiments, the system provider device 211 may include information about the location and types of products within the merchant physical location 200 in order to match a location of a customer with a particular product adjacent that location that the customer may be inferred to be viewing. Furthermore, the location and timing data tracked for the customer may be used with the systems described in the product viewing tracking examples below to help determine which products the customer has viewed in the merchant physical location 200.

In another example, the customer device of the customer may be used to send product viewing information to the system provider device 211. For example, the customer device of the customer may include a scanning application such as for example, the RedLaser® application available from eBay, Inc. of San Jose, Calif. In such an example, the customer may use the scanning application and the customer device to scan one or more products located in the product areas 206 of the merchant physical location 200, and that scanning information may be provided to the system provider device 211 (e.g., over a network from the customer device to the scanning application provider device, and over the network from the scanning application provider device to the system provider device 211.)

In another embodiment, products located in the product areas may include NFC or RFID devices that may interact with an NFC or RFID device in the customer device (or otherwise associated with the customer as that customers move through the merchant physical location 200) to record products viewed and/or handled by the customer. For example, NFC or RFID systems may allow the customer device to detect only products handled by the customer, and report those products to the system provider device 211.

In another embodiment, the sensors may include cameras that capture images and/or video of the customer's actions in the merchant physical location 211, and those images and/or video may be provided to the system provider device 211 for analysis to determine which products in the merchant physical location 200 are being viewed, handled, or otherwise interacted with by the customer. For example, cameras may capture images or video of the customer handling products from the product areas 206, looking at particular products in the product areas 206, or otherwise viewing or interacting with products such that the customer's interest in that product may be detected (e.g., by an image of the customer holding the product) or inferred (e.g., by an image of the customer looking at the product).

In another embodiment, the customer may include a bag, cart, or other product carrying device that is used to collect products within the merchant physical location prior to paying the merchant for those products. Using the systems in the product viewing tracking examples discussed above (e.g., NFC or RFID enabled carts and products, images captured of products in the cart, etc.), the products selected by the customer for purchase may be tracked.

While a few examples of the tracking of products viewed by the customer have been described above, one of skill in the art in possession of the present disclosure will appreciate that variety of systems known in the art may be incorporated into the merchant-customer engagement system to allows products that are viewed, handled, or otherwise interacted with by the customer in the merchant physical location 200 to be tracked while remaining within the scope of the present disclosure.

The method 100 may then proceed to block 112 where a purchase history for the identified customer is retrieved. In an embodiment, using the customer account information retrieved at block 104, a purchase history of the identified customer may be retrieved by the system provider device 211 over the network. For example, the customer account information may include information identifying a payment account the customer has with the merchant associated with the merchant physical location 200, and at block 112, the purchase history that includes a plurality of products purchased from that merchant may be retrieved. The purchase history may include purchases of product made at the merchant physical location 200, purchases of products made at other physical locations associated with that merchant, online purchases of products through an online store of the merchant, etc.

In another example, the customer account information may include information identifying a payment account the customer has with a payment account provider or payment service provider, and at block 112, the purchase history that includes a plurality of products purchased from one or more merchants may be retrieved. The purchase history may include purchases of product made at any merchant physical locations, online purchases of products through online store of any merchants, etc. For example, any purchases made by the customer on their credit card from any of a variety of merchants may be retrieved or reviewed.

In an embodiment, the purchase history retrieved at block 112 may be limited to product types. In one embodiment, if the merchant physical location sells products of a particular product type or class, the purchase history retrieved at block 112 may be restricted to purchases of products that are of that product type or class. For example, the merchant physical location 200 may be a grocery store, and at block 112, the purchase history retrieved for the customer may be limited or restricted to grocery purchases. In another example, the merchant physical location 200 may be a clothing store, and at block 112, the purchase history retrieved for the customer may be limited or restricted to clothing purchases. In some embodiments, the purchase history retrieved at block 112 may be limited by a current location of the customer within the merchant physical location 200 as tracked at block 106, (e.g., limited to cheese purchases if the customer is located in a cheese section of a grocery store, limited to blouses if the customer is located in a blouse section of a clothing store, etc.) or by a product or products viewed by the identified customer as tracked at block 110 (e.g., limited to wine if a customer is currently viewing wine products.)

In some embodiments, the purchase history retrieved at block 112 may be limited by time periods. For example, only purchases made by the identified customer in the previous month, week, day, etc. may be considered for retrieval as the purchase history at block 112. In some embodiments, the merchant and/or system provider associated with the merchant physical location 200 may be able to adjust the time period for which purchase histories may be retrieved at block 112. While a few examples of purchase histories have been provided, one of skill in the art in possession of the present disclosure will recognize how the retrieval of purchase histories and filtering of purchase histories to determine particular products previously purchased by the customer provides benefits in the merchant-customer engagement system and will fall within the scope of the present disclosure.

The method 100 may then proceed to block 114 where recommended products for the identified customer are determined. As discussed below, any of the retrieved customer account information, the location tracking, the time tracking, the product viewing tracking, the purchase history of the identified customer, and/or any other customer information available to the system provider device 211 may be used to determine recommended products for the customer. Thus, while many of the examples below with regard to determining recommended products reference information retrieved from only one of these method blocks, one of skill in the art in possession of the present disclosure will recognize that different combinations of information retrieved from multiple blocks of the method 100 may provide for more accurate and/or useful product recommendations for a customer.

In an embodiment, the customer account information retrieved at block 104 may include customer preferences (e.g., provided by the customer in opening the customer account), previous customer tracking information, and/or a variety of other customer account information that may be used to determine one or more products to recommend to the customer. Furthermore, customer account information may link to multiple customer accounts from which information may be retrieved in order to determine the recommended products at block 114. In a specific example, the customer account information may include a customer gender and customer preferences of brands or other product indicators that are used in making the product recommendation at block 114. In another specific example, the customer account information may include a social media profile address for the customer, and the social media profile associated with that social media profile address may be accessed and the information in that social media profile (e.g., hobbies, likes, dislikes, groups the customer belongs to, etc.) may be used to determine the recommended products at block 114.

In an embodiment, the tracked location of the customer within the merchant physical location 200 may be used to determine one or more products to recommend to the customer. For example, the customer's current location in the merchant physical location 200 may coincide with a particular product type or class that may then be used to determine a recommended product at block 114. In another example, the identified customer's movement towards a particular area of the merchant physical location 200 may be used to determine a recommended product that is located in that particular area to which the customer is headed.

In an embodiment, the tracked amount of time the customer spends in designated areas within the merchant physical location may be used to determine one or more products to recommend to the customer. For example, the customer's being stopped or located in the same aisle 208 for a period of time may be used to determine recommended products in that aisle at block 114. In another example, the customer's movement quickly into a particular area of the merchant physical location 200 (e.g., immediately upon entering the merchant physical location 200) may be used to determine recommended products located in that area at block 114.

In an embodiment, the tracked products viewed by the customer may be used to determine one or more products to recommend to the customer at block 114. For example, the viewing by the customer of a particular product may be used to determine recommended products (e.g., similar products, complementary products, etc.) at block 114.

In an embodiment, the purchase history or histories retrieved for the customer may be used to determine one or more products to recommend to the customer at block 114. For example, purchase histories may be used to determine a type, style, brand, or other product characteristic that is preferable to the customer, and may be used to determine recommended products at block 114. In another example, a plurality of recent purchases by the customer that are detailed in the purchase history or histories may be used to determine a complementary product (associated with the recent purchases) to recommend to the customer. In another example, a plurality of recent purchases by the customer may be used to determine products that should not be recommended to the identified customer (e.g., a particular shirt associated with a recent purchase and/or similar shirts may not be recommended to the customer because they already own that shirt or a similar shirt.)

Thus, the recommended products for the customer may be determined using a variety of information retrieved and/or collected for the customer based on preference information associated with the customer, based on previous actions of the customer in the merchant physical location 200, based their current actions of the customer in the merchant physical location 200, based on a history of purchases by the customer from the merchant associated with the merchant physical location 200, based on a history of purchases by the customer elsewhere (e.g., different location and/or different merchants, and/or a variety of other product recommendation information known in the art. Furthermore, the tracking of the customer with regard to location, time data, and products viewed may be continuously performed by the system provider device 211 and used, by itself and/or with the retrieved product history or histories, to determined recommended products for the customer throughout the method 100. Thus, as the customer moves about the merchant physical location 200, different product recommendations may be determined as described above, based on that customers actions within the merchant physical location 200 such that product recommendations for that customer change as the customer performs different actions within the merchant physical location 200.

The method 100 may then proceed to block 116 where the identified customer is detected by a merchant mobile device, and then to block 118 where merchant-customer engagement information for the identified customer is provided on the merchant mobile device. The embodiments discussed below provide a few examples of mobile merchant devices displaying merchant-customer engagement information, but those examples are not meant to be limiting, and other merchant devices and displays of merchant-customer engagement information will fall within the scope of the present disclosure.

Figure 3:
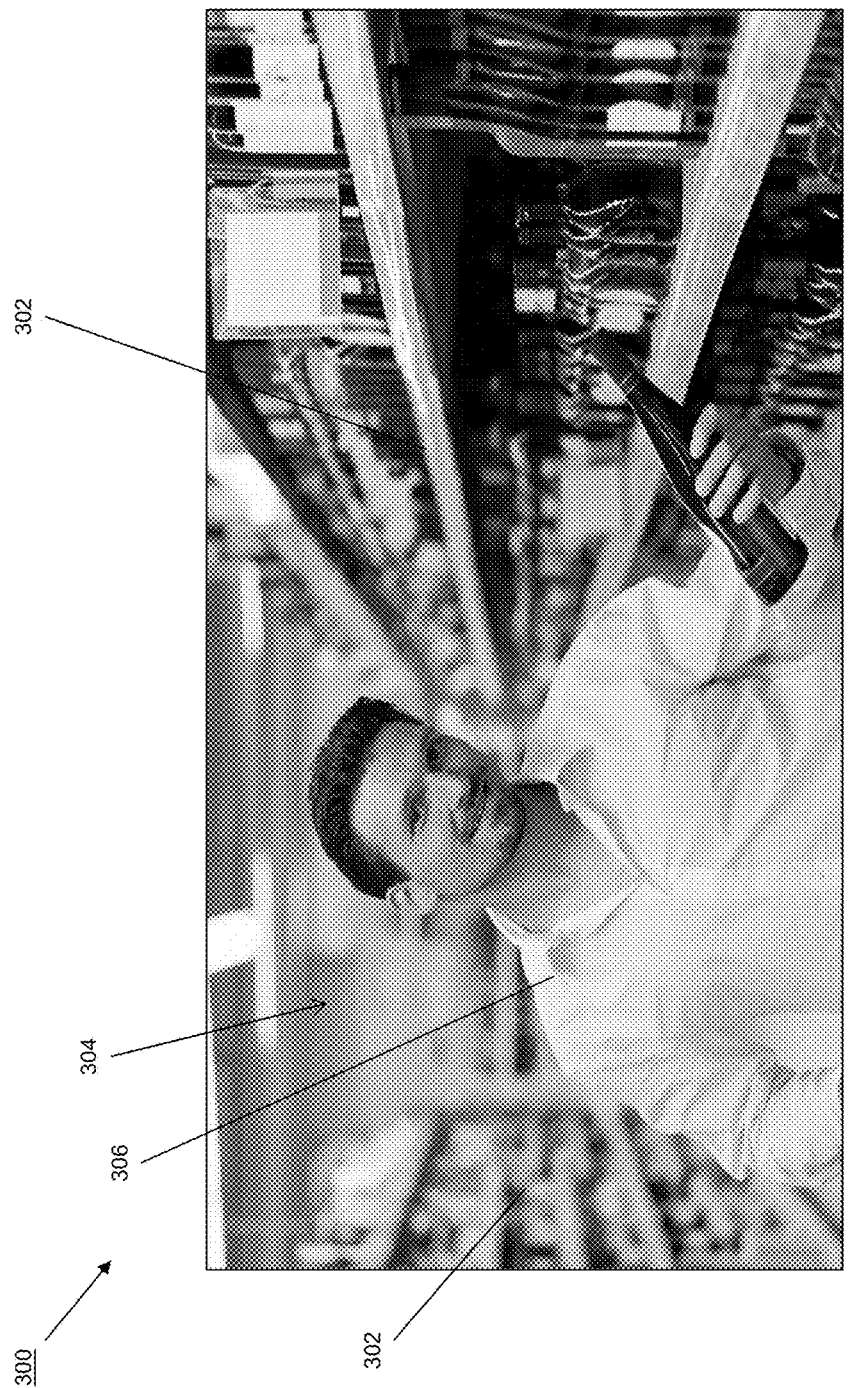
FIG. 3 is a front view illustrating an embodiment of a customer in the merchant physical location of FIG. 2.

Referring now to FIG. 3, an embodiment of a merchant physical location 300 is illustrated that may be the merchant physical location 200 discussed above with reference to FIG. 2. The merchant physical location 300 includes product areas 302 that may be the product areas 206 discussed above with reference to FIG. 2, and a product aisle 304 between the product areas 302 that may be one of the product aisles 208 discussed above with reference to FIG. 2. In the illustrated embodiment, the merchant physical location 300 is a grocery store, and a customer 306 is located in the merchant physical location 300 in the aisle 304. As discussed above with reference to blocks 102-114 of the method 100, the customer 306 may have been identified at the merchant physical location 300, had their customer account information retrieved, their location throughout the merchant physical location 300 tracked, timing data within the merchant physical location 300 tracked, products viewed in the merchant physical location 300 tracked, purchase history or histories retrieved, and recommended products periodically determined prior to the customer 306 being located in the aisle 304 of the merchant physical location 300 as illustrated in FIG. 3.

Referring now to FIGS. 4a, 4b, 4c, and 4d, embodiments of screen shots from a wearable mobile merchant device are illustrated to provide an example of how merchant-customer engagement information may be provided on a mobile merchant device and used to help the customer 306 at the merchant physical location 300 discussed above with reference to FIG. 3. The wearable mobile merchant device used to provide the screen shots illustrated in FIGS. 4a, 4b, 4c, and 4d may be a wearable computing device such as, for example, Google Glass® available from Google Inc. of Mountain View, Calif., and is discussed more fully below with reference to FIG. 10. However, for the purposes of the embodiment illustrated in FIGS. 4a-d, the wearable mobile merchant device is being worn by a merchant or merchant employee ("merchant" hereinafter), and includes a transparent display that is positioned between the merchant and the customer 306 such that images generated by the wearable mobile merchant device may be superimposed over the merchant's view of the customer 306.

Figure 4A:
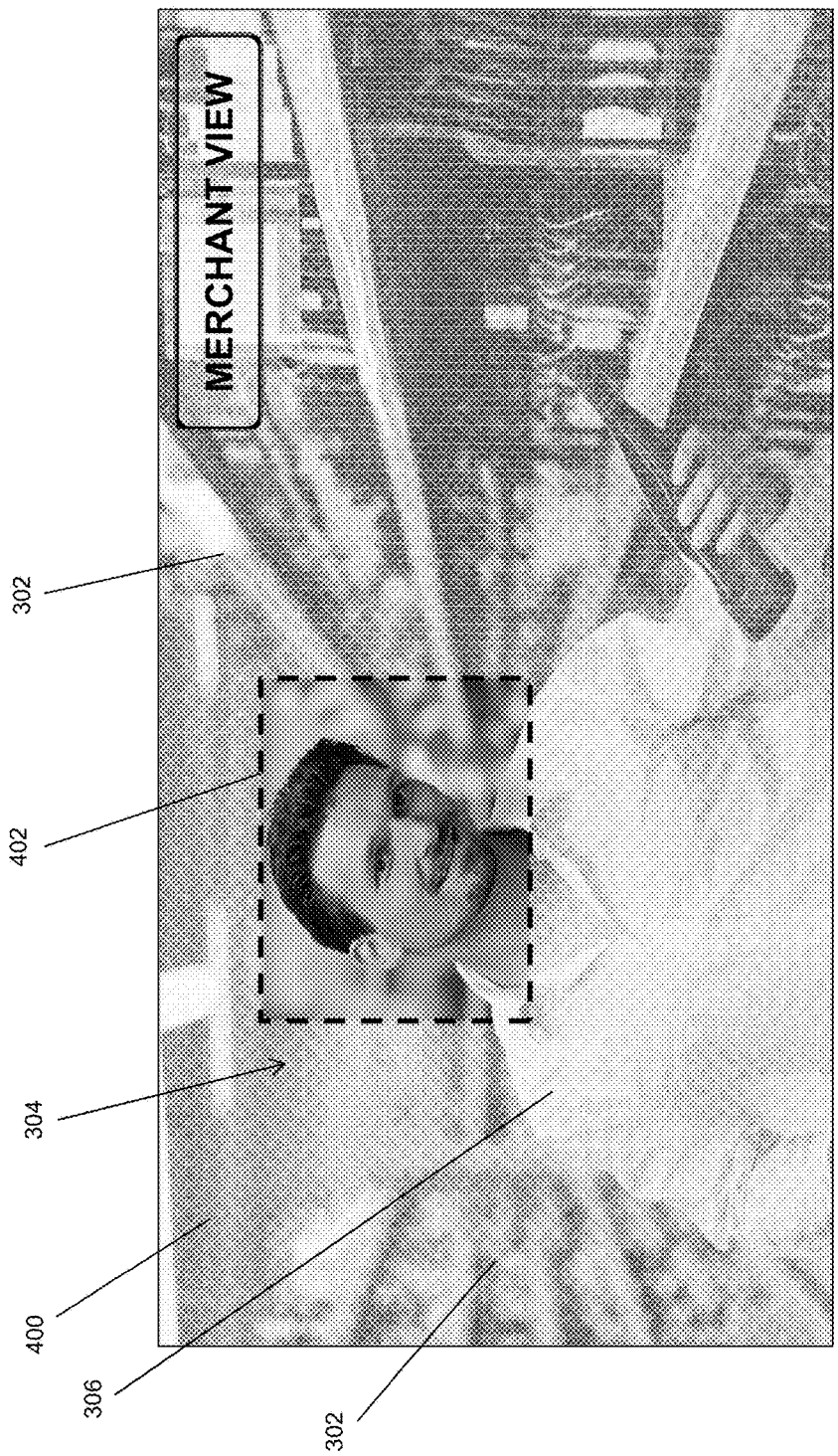
FIG. 4*a* is a screen shot illustrating an embodiment of a customer detection screen view of the customer of FIG. 3 through a wearable merchant device.

FIG. 4a illustrates an embodiment of a customer detection screen 400 that is provided at block 116 of the method 100 when the merchant physically approaches the customer 306 in the merchant physical location 300. In the illustrated embodiment, the customer detection screen 400 includes a customer detection box 402 that is superimposed over the merchant's view of the customer 306 such that it highlights the face of the customer detected at block 116. In different embodiments, the detection of the identified customer at block 116 may be performed in a variety of ways, a few of which are discussed below.

In one embodiment, the wearable mobile merchant device may capture an image (e.g., via a camera on the wearable mobile merchant device, discussed below with reference to FIG. 10) of the customer and send that image to the system provider device 211, and the system provider device 211 may then use facial recognition techniques and/or a database image search to determine whether that image matches an image of the customer 306 (e.g., previously stored in a database, captured and stored at block 102 of the method 100, etc.)

In another embodiment, the location of the wearable mobile merchant device in the merchant physical location 300 (e.g., periodically provided to the system provider device 211) may be used along with the location tracking information of customers in the merchant physical location 300 to detect that the customer 306 is adjacent the merchant and wearable mobile merchant device. In such embodiments, the wearable mobile merchant device may include a compass or other direction determination system to help determine which direction the merchant is facing to assist in detecting the identified customer 306 (e.g., directionality and location of the wearable mobile merchant device may help to distinguish between customers when multiple customers are located adjacent the merchant with the wearable mobile merchant device). In some embodiments, the wearable mobile merchant device may then use facial recognition techniques to provide the customer detection box 402 for the customer that has been detected, and/or to confirm the detected customer.

In another embodiment, NFC or RFID communication between the wearable mobile merchant device and a customer device may be used to detect the identified customer 306. Thus, as the merchant approaches the customer 306, the wearable mobile merchant device and a customer device of the customer 306 may communicate to exchange information identifying the customer 306 such that the customer is detected at block 116. In some embodiments, the wearable mobile merchant device may then use facial recognition techniques to provide the customer detection box 402 for the customer that has been detected, and/or to confirm the detected customer.

Figure 4B:
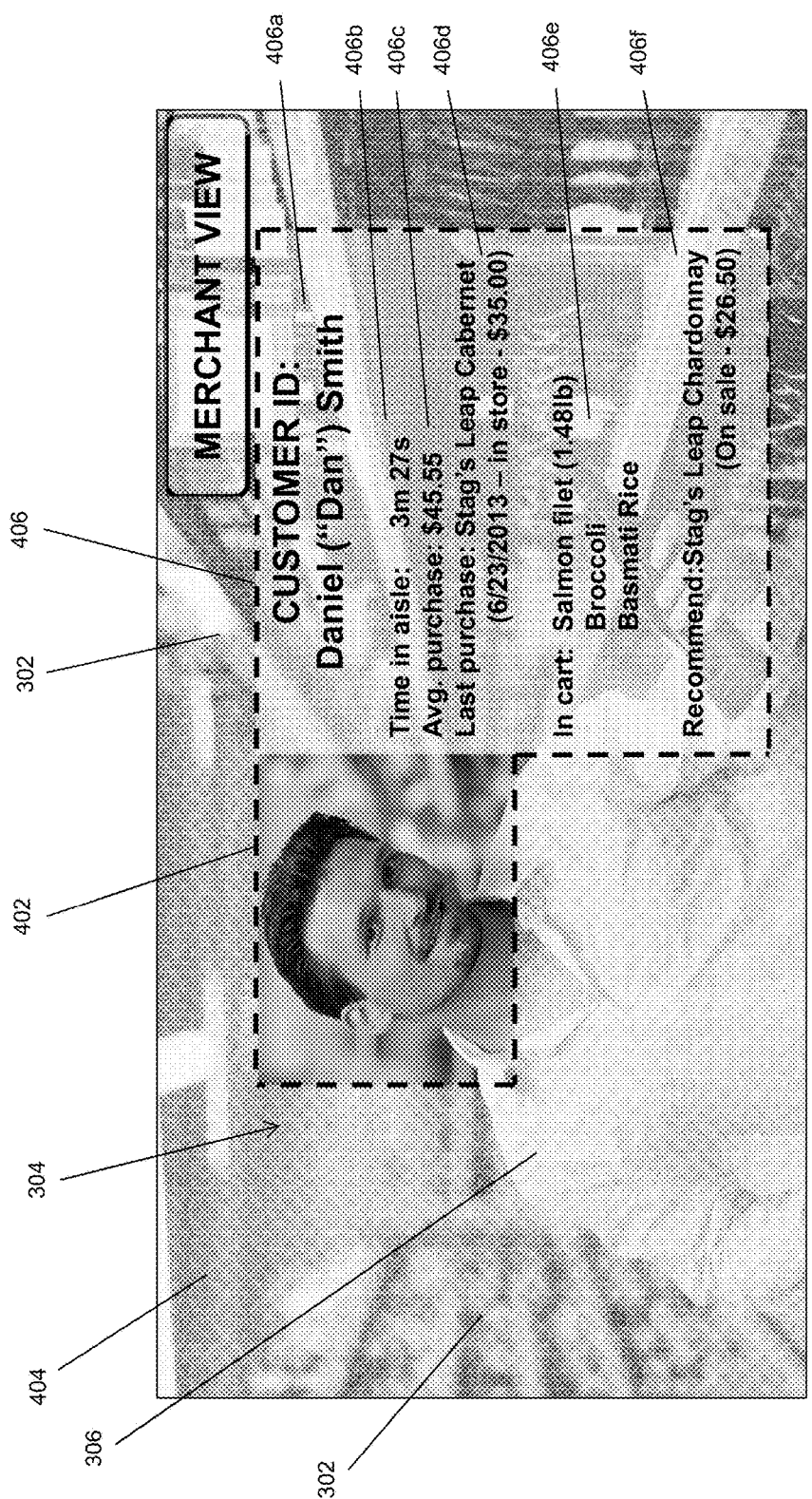
FIG. 4*b* is a screen shot illustrating an embodiment of a customer information screen view of the customer of FIG. 3 through a wearable merchant device.
Figure 4C:
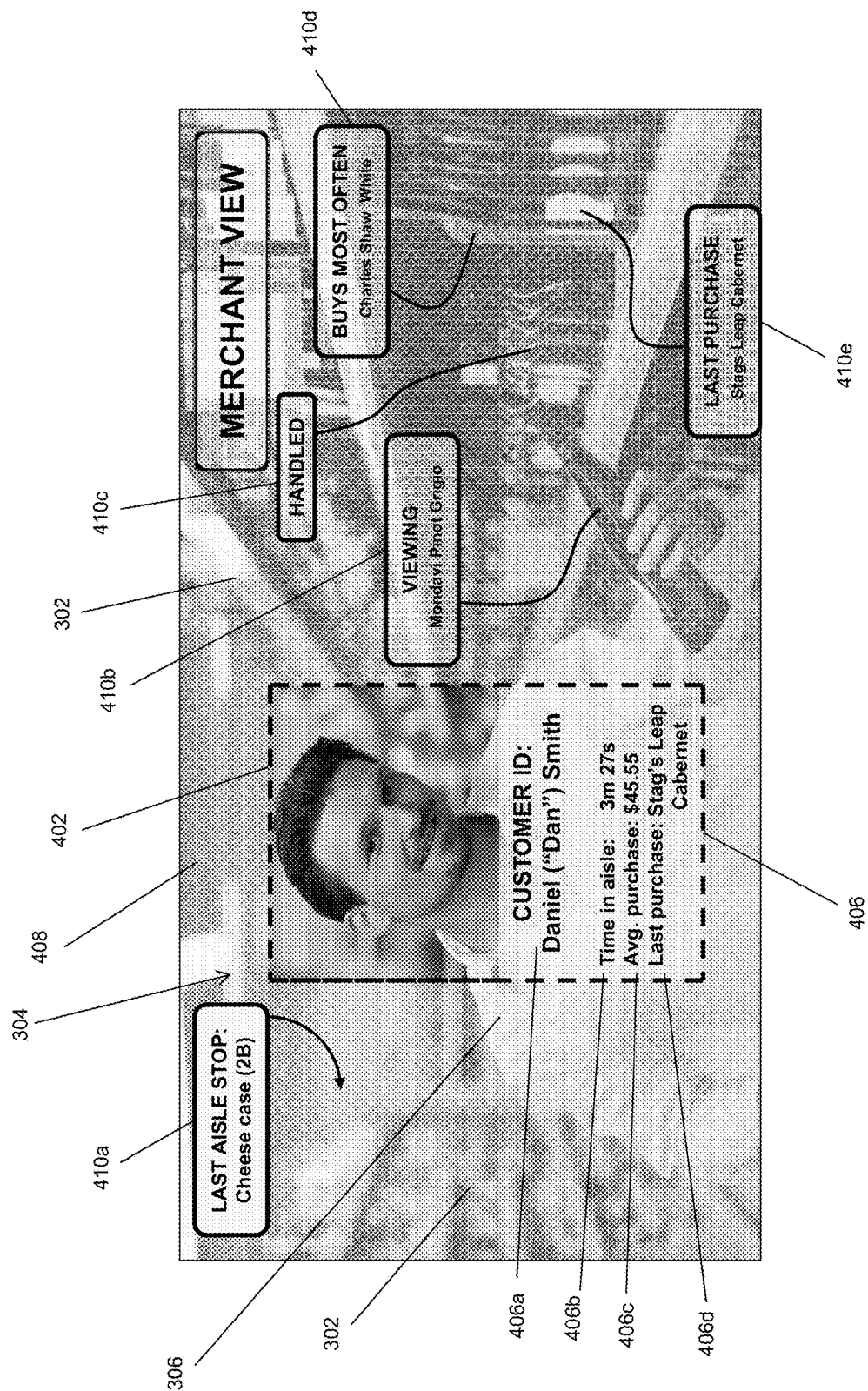
FIG. 4*c* is a screen shot illustrating an embodiment of a customer information screen view of the customer of FIG. 3 through a wearable merchant device.

Thus, at block 116 of the method 100, the customer 306 is detected by a wearable mobile merchant device worn by a merchant located adjacent the customer 306 in the merchant physical location 200, and the method proceeds to block 118 where merchant-customer engagement information for the customer is provided on the wearable mobile merchant device. As discussed above, the detection of the customer using the wearable mobile merchant device at block 116 include the wearable mobile merchant device receiving some identifying information about the customer such as, for example, an image of the customer 306 that is used to detect the customer 306, a location of the customer device of the customer 306 that is used to detect the customer 306, communication of the identity of the customer 306 between the customer device of the customer 306 and the wearable mobile merchant device, etc. At block 118, that identifying information is used by the system provider device 211 and matched against a customer identified in the merchant physical location 300 at block 102. As discussed above, at block 102 of the method 100, customers in the merchant physical location are identified, and thus the identifying information for the customer detected by the wearable mobile merchant device may be used by the system provider device 211 at block 118 to allow any information collected about that customer 306 to be transmitted to the wearable mobile merchant device. FIGS. 4b and 4c below illustrate just a few examples of merchant-customer engagement information that may be displayed on the wearable mobile merchant device at block 118.

Referring now to FIG. 4b, an embodiment of a merchant-customer engagement information screen 404 displayed on a wearable mobile merchant device is illustrated. In the illustrated embodiment, the merchant-customer engagement information screen 404 is provided at block 118 of the method 100 after detecting the customer 306 at block 116. For example, the merchant wearing the wearable mobile merchant device approached the identified customer 306 in the aisle 304, and the wearable mobile merchant device detected the identified customer 306 as discussed above. The system provider device 211 then used the detection of the customer 306 to send back merchant-customer engagement information to the wearable mobile merchant device that may include any information tracked or retrieved for the customer 306 during the method 100. As illustrated in FIG. 4b, the wearable mobile merchant device then provides a merchant-customer engagement information window 406 adjacent the customer detection box 402 that includes a plurality of merchant-customer engagement information located adjacent the merchant's view of the customer 306 through the wearable mobile merchant device.

In the example illustrated in FIG. 4b, the merchant-customer engagement information displayed in the merchant-customer engagement information window 406 on the wearable mobile merchant device includes customer account information such as a customer identification 406a (e.g., "Daniel 'Dan' Smith" in the illustrated embodiment) that may have been retrieved at block 104 of the method 100 and that, the illustrated example, includes a name and nickname of the customer 306. The merchant-customer engagement information also includes timing data 406b (e.g., "Time in aisle: 3 m 27 s") that may have been tracked at block 108 of the method 100 and that includes, in the illustrated example, how long the customer 306 has been located in the aisle 304. The merchant-customer engagement information also includes purchase history information 406c (e.g., "Avg. purchase: $45.55") that may have been retrieved at block 112 of the method 100 or determined from information retrieved at block 112 and that includes, in the illustrated example, the average amount the customer 306 spends at the merchant physical location 300. The merchant-customer engagement information also includes purchase history information 406d (e.g., "Last purchase: Stag's Leap Cabernet (Jun. 23, 2013—in store—$35.00)") that may have been retrieved at block 112 of the method 100 and that includes, in the illustrated example, the most recent purchase of a product associated with a product type in product area 302. The merchant-customer engagement information also includes product viewing information 406e (e.g., "In card: Salmon filter (1.48 lb); Broccoli; Basmati Rice") that may have been tracked at block 110 of the method 100 or based on the tracking at block 110 (e.g., a customer cart may include an RFID system that reads RFID on products to determine what the customer 306 has put in their cart; images of a customer cart may be captured and analyzed to determined what the customer has put in their cart, etc.) The merchant-customer engagement information also includes recommended product information 406f (e.g., "Recommend: Stag's Leap Chardonnay (On sale—$26.50)") that may have been determined at block 114 of the method 100 based on, for example, the products located in the cart of the customer 306 (e.g., a wine pairing for the food located in the cart of the customer.)

Referring now to FIG. 4c, an embodiment of a merchant-customer engagement information screen 408 is illustrated. In the illustrated embodiment, the merchant-customer engagement information screen 408 may be selected for display by the merchant wearing the wearable mobile merchant device after the display of the merchant-customer engagement information screen 404, or may be presented by itself or prior to the display of the merchant-customer engagement information screen 404. For example, the merchant wearing the wearable mobile merchant device approached the customer 306 in the aisle 304, the wearable mobile merchant device detected the customer 306 as discussed above and received and displayed the merchant-customer engagement information screen 404. The system provider device 211 then sends further merchant-customer engagement information to the wearable mobile merchant device that may include other information tracked or retrieved for the customer 306 during the method 100. As illustrated in FIG. 4c, the wearable mobile merchant device has minimized and moved the merchant-customer engagement information window 406 to a different location adjacent the customer detection box 402, and the merchant-customer engagement information window 406 includes some of the plurality of merchant-customer engagement information discussed above positioned adjacent the merchant's view of the customer 306 through the wearable mobile merchant device. Furthermore, the further merchant-customer engagement information received by the wearable mobile merchant device may then be displayed adjacent the merchant's view of the customer 306, adjacent products in the product areas 302, adjacent the aisle 304, and any superimposed over any other feature detected in the view of the merchant.

In the example illustrated in FIG. 4c, the merchant-customer engagement information displayed on the wearable mobile merchant device includes designated area tracking information 410a (e.g., "LAST AISLE STOP—Cheese case (2B)" along with a directional arrow towards a designated area in the merchant physical location 200) that may have been tracked at blocks 106 and/or 108 of the method 100 and that includes, in the illustrated example, an indication of the aisle the customer 306 was previously located in. The merchant-customer engagement information also includes product viewing information 410b (e.g., "VIEWING Mondavi Pinot Grigio" along with an indicator in the view of the merchant that attaches to a product being currently viewed by the customer 306) that may have been tracked at block 110 of the method 100 or determined from information tracked at block 110 and that includes, in the illustrated example, the name of a product currently being handled by the customer 306. The merchant-customer engagement information also includes product viewing information 410c (e.g., "HANDLED" along with an indicator in the view of the merchant that attaches to a product previously handled by the customer 306) that may have been tracked at block 110 of the method 100 or determined from information tracked at block 110 and that includes, in the illustrated example, an indication of a product in the product area 302 that the customer recently handled. The merchant-customer engagement information also includes purchase history information 410d (e.g., "BUYS MOST OFTEN Charles Shaw White" along with an indicator in the view of the merchant that attaches to a product typically purchased by the customer 306) that may have been retrieved at block 112 of the method 100 or based on the information retrieved at block 112 and that includes, in the illustrated example, an indication of a product in the product area that the customer 306 purchases most often. The merchant-customer engagement information also includes purchase history information 410e (e.g., "LAST PURCHASE Stags Leap Cabernet" along with an indicator in the view of the merchant that attaches to a product most recently purchased by the customer 306) that may have been retrieved at block 112 of the method 100 or based on the information retrieved at block 112 and that includes, in the illustrated example, an indication of a product in the product area 302 that the customer 306 most recently purchased.

Figure 4D:
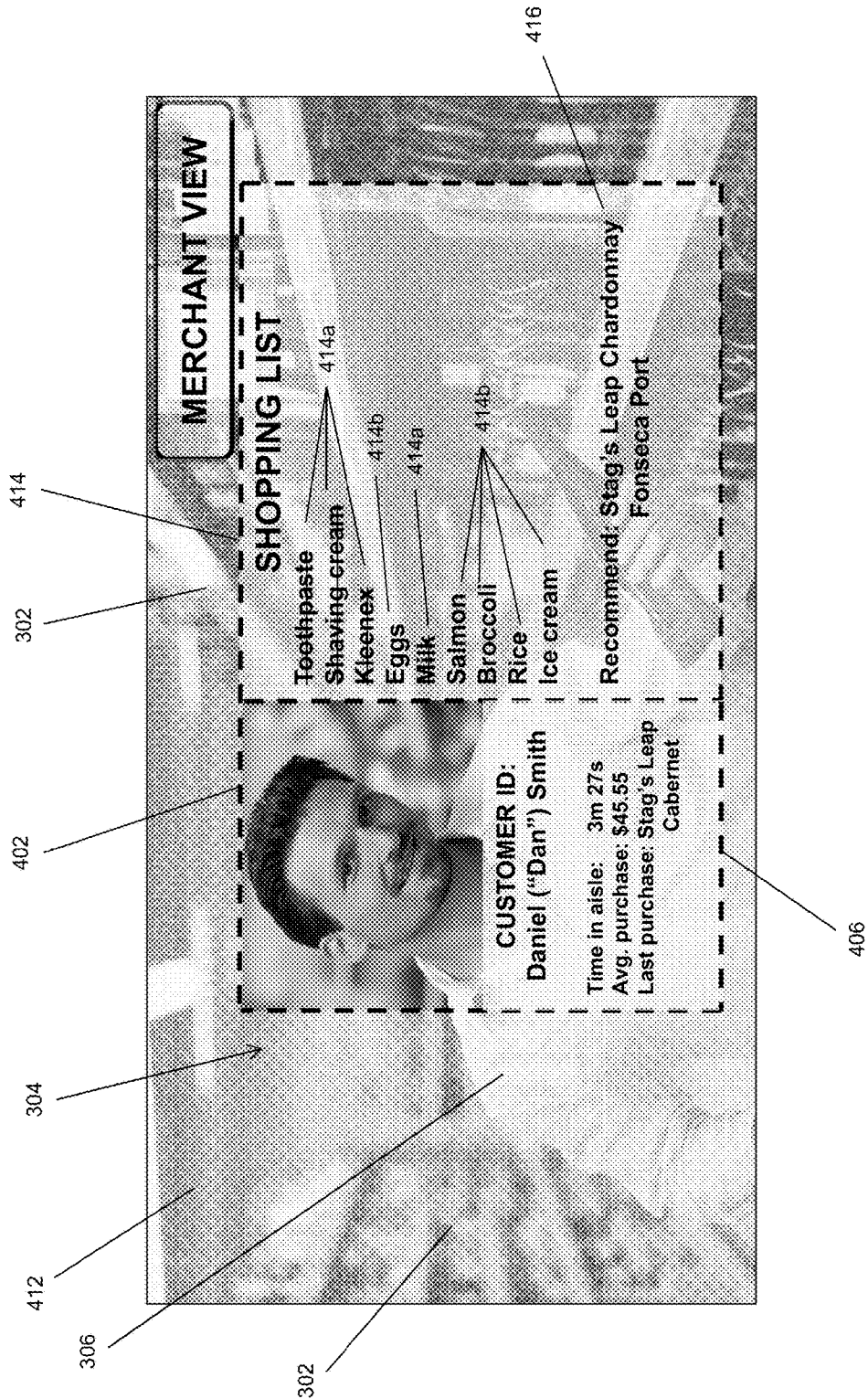
FIG. 4*d* is a screen shot illustrating an embodiment of a customer information screen view of the customer of FIG. 3 through a wearable merchant device.

Referring now to FIG. 4d, an embodiment of a merchant-customer engagement information screen 412 is illustrated. In the illustrated embodiment, the merchant-customer engagement information screen 412 may be provided for display to the merchant wearing the wearable mobile merchant device at any time after the display of the merchant-customer engagement information screen 404. For example, the merchant wearing the wearable mobile merchant device approached the customer 306 in the aisle 304, the wearable mobile merchant device detected the customer 306 as discussed above, and the system provider device 211 then sends merchant-customer engagement information to the wearable mobile merchant device that may include other information tracked or retrieved for the customer 306 during the method 100. As illustrated in FIG. 4d, the wearable mobile merchant device has provided the merchant-customer engagement information window 406 adjacent the customer detection box 402, and the merchant-customer engagement information window 406 includes some of the plurality of merchant-customer engagement information discussed above positioned adjacent the merchant's view of the customer 306 through the wearable mobile merchant device. Furthermore, the further merchant-customer engagement information received by the wearable mobile merchant device may then be displayed adjacent the merchant's view of the customer 306.

In the example illustrated in FIG. 4d, the merchant-customer engagement information displayed on the wearable mobile merchant device includes shopping list information retrieved from the customer device of the customer 306. For example, the customer device of the customer 306 may include a shopping application, notepad, or other list recording application known in the art that allows the customer 306 to create a shopping list of products to purchase when at a merchant physical location, and prior to entering the merchant physical location 300, the customer 306 may have created such a shopping list by providing products in the shopping list for purchase at the merchant physical location 300. In an embodiment of block 104, the system provider device may have used the customer account information (e.g., access information for the customer device, shopping application, etc.) to retrieve the shopping information from the customer device. In other embodiments, the shopping list may be retrieved from an online website that allows the customer 306 to create shopping lists substantially as discussed above.

In the embodiment illustrated in FIG. 4d, the merchant-customer engagement information screen 412 includes a shopping list section 414 that includes a plurality of products that were included on the shopping list of the customer 306 retrieved at block 104. Furthermore, the shopping list section 414 may have been dynamically changed as the customer 306 interacted with products within the merchant physical location 300. For example, as discussed above, the merchant physical location 300 may include the ability to track products that the customer 306 has put in their cart, and when a product in the shopping list section is put in the cart of the customer 306, that product may be "crossed off", as illustrated for the toothpaste, shaving cream, Kleenex, and milk products 414a in the shopping list section 414. As such, a plurality of products not "crossed off", as illustrated for the salmon, broccoli, rice, and ice cream products 414b, that are not in the cart of the customer 306 may be used for product recommendations for the customer 306. Furthermore, in the illustrated example, the system provider device has used the products in the shopping list section 414 to determine product recommendations 416 based on the location of the customer 306 in the merchant physical location 300. For example, the location of the customer 306 in the illustrated embodiment is a wine section of the merchant physical location, and the product recommendations includes a suggestion of a particular type of wine (e.g., "Stag's Leap Chardonnay") based on the salmon product 414b in the shopping list section 414, as well as a suggestion of another particular type of wine (e.g., Fonseca Port) based on the ice cream product 414b in the shopping list section 414. While a few examples of product recommendations generated by the system provider device has been discussed, one of skill in the art in possession of the present disclosure will recognize that the display of the shopping list section 414 on the merchant-customer engagement information screen 412 provides the merchant with the ability to provide a wide variety of help for the customer 306 that will fall within the scope of the present disclosure, including suggestions for particular products in the shopping list section 414 but not in the cart of the customer 306 (e.g., Sockeye Salmon on sale for the salmon product 414b, Ben and Jerry's® ice cream for the ice cream product 414b, etc.)

Thus, a variety of merchant-customer engagement information may be displayed on the wearable mobile merchant device such that the merchant may offer to help the customer 306 in determining products to purchase. One of skill in the art in possession of the present disclosure will recognize that a wide variety of merchant-customer engagement information not included in the example above may be beneficial in providing help to a customer, and will fall within the scope of the present disclosure. While the display of the merchant-customer engagement information adjacent the view of the customer 306 may provide several benefits including, for example, seamless merchant-customer engagement information lookup and use by the merchant when interacting with the customer 306, such wearable mobile merchant devices are not required in some embodiments of the systems and methods of the present disclosure.

For example, FIG. 5 illustrates a mobile merchant device 500, described in more detail with reference to FIG. 11 below, which is displaying the customer detection screen 400 on a display 502 (e.g., the mobile merchant device 500 may include a camera opposite the display 502 that captures the image of the customer 306 in the merchant physical location 300 and provides the customer detection screen 400 over that image, as illustrated.) The mobile merchant device 500 may also display selection buttons that may be selected by the merchant to display particular types of merchant-customer engagement information tracked and/or retrieved during the method 100, including a location button 504a for displaying merchant-customer engagement information related to the location of the customer 306 in the merchant physical location 300, a timing data button 504b for displaying merchant-customer engagement information related to the timing data associated with the customer 306 in the merchant physical location 300, a product viewing button 504c for displaying merchant-customer engagement information related to the products viewed by the customer 306 in the merchant physical location 300, a purchase history button 504d for displaying merchant-customer engagement information related to the previous purchases by the customer 306, and a recommended products button 504e for displaying products recommended for the customer 306 in the merchant physical location 300. As such, the mobile merchant device 500 may display a variety of merchant-customer engagement information screens similar to the merchant-customer engagement information screens 404 and 408 discussed above.

Figure 6:
FIG. 6 is a front view illustrating an embodiment of a customer in the merchant physical location of FIG. 2.

Referring now to FIG. 6, an embodiment of a merchant physical location 600 is illustrated that may be the merchant physical location 200 discussed above with reference to FIG. 2. The merchant physical location 600 includes a product area 602 that may be one of the product areas 206 discussed above with reference to FIG. 2, and product aisles adjacent either side of the product area 602 that may be the product aisles 208 discussed above with reference to FIG. 2. In the illustrated embodiment, the merchant physical location 600 is a clothing store, and a customer 604 is shopping in the merchant physical location 600 in an aisle adjacent the product area 602. As discussed above with reference to blocks 102-114 of the method 100, the customer 604 may have been identified at the merchant physical location 600, had their customer account information retrieved, their location throughout the merchant physical location 600 tracked, timing data within the merchant physical location 600 tracked, products viewed in the merchant physical location tracked, their purchase history or histories retrieved, and recommended products periodically determined prior to the customer 604 being located in the aisle of the merchant physical location 300 as illustrated in FIG. 3.

Referring now to FIGS. 7a, 7b, 7c, and 7d, embodiments of screen shots from a wearable mobile merchant device are illustrated to provide an example of how merchant-customer engagement information may be provided on a mobile merchant device and used to help a customer at the merchant physical location 600 discussed above with reference to FIG. 6. Similarly as discussed above, the wearable mobile merchant device used to provide the screen shots illustrated in FIGS. 7a, 7b, 7c, and 7d may be a wearable computing device such as, for example, Google Glass® available from Google Inc. of Mountain View, Calif., and is discussed more fully below with reference to FIG. 10. However, for the purposes of the embodiment illustrated in FIGS. 7a-d, the wearable mobile merchant device is being worn by a merchant or merchant employee ("merchant" hereinafter) and includes a transparent display that is positioned between the merchant and the customer 604 such that images generated by the wearable mobile merchant device may be superimposed over the merchant's view of the customer 604.

Figure 7A:
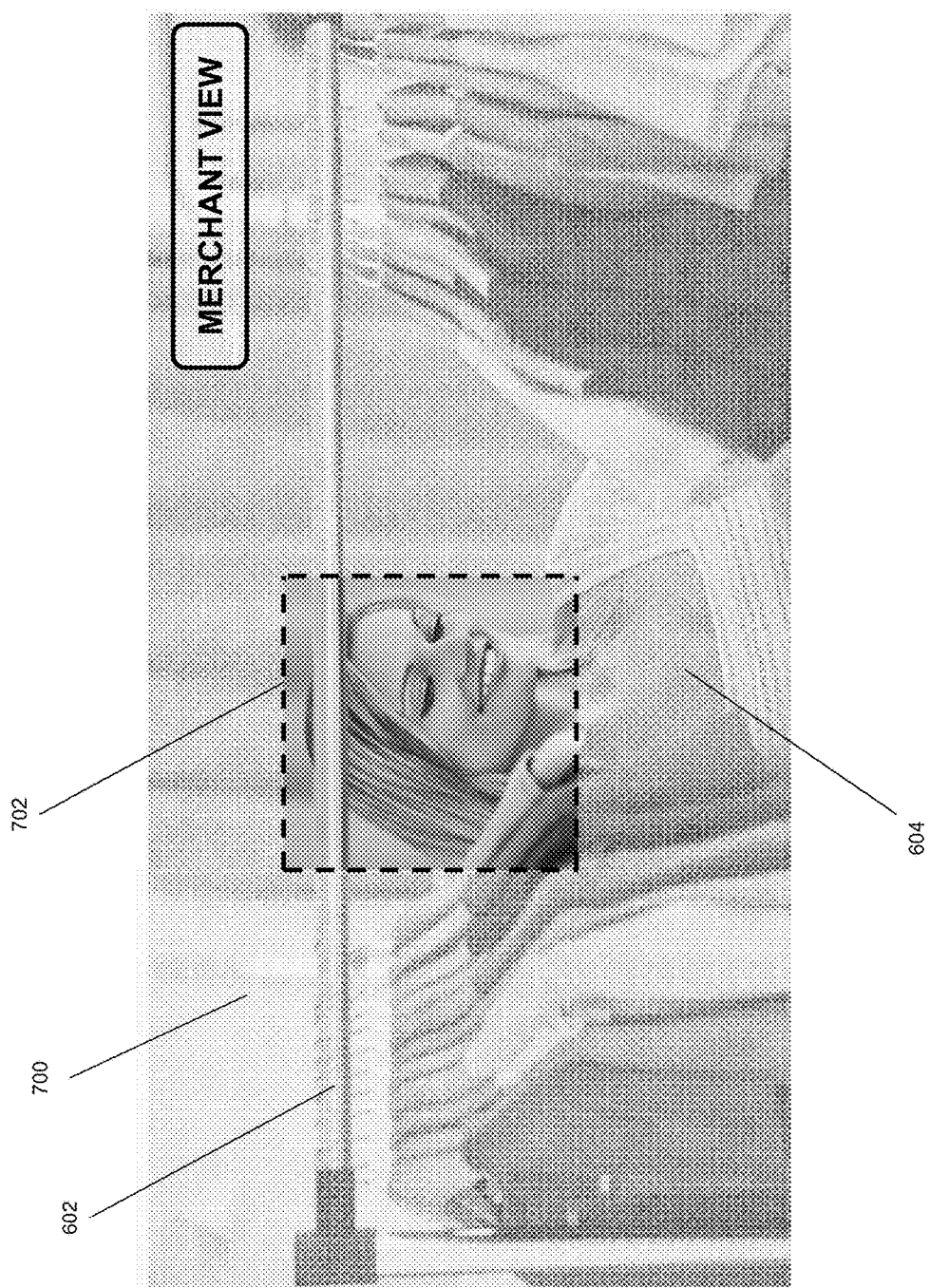
FIG. 7*a* is a screen shot illustrating an embodiment of a customer detection screen view of the customer of FIG. 6 through a wearable merchant device.

FIG. 7a illustrates an embodiment of a customer detection screen 700 that is provided at block 116 of the method 100 when the merchant approaches the customer 604. In the illustrated embodiment, the customer detection screen 700 includes a customer detection box 702 that is superimposed over the merchant's view of the customer 604 such that it highlights the face of the customer detected at block 116. In different embodiments, the detection of the identified customer at block 116 may be performed in a variety of ways, a few of which are discussed above with reference to FIGS. 4a-c.

Figure 7B:
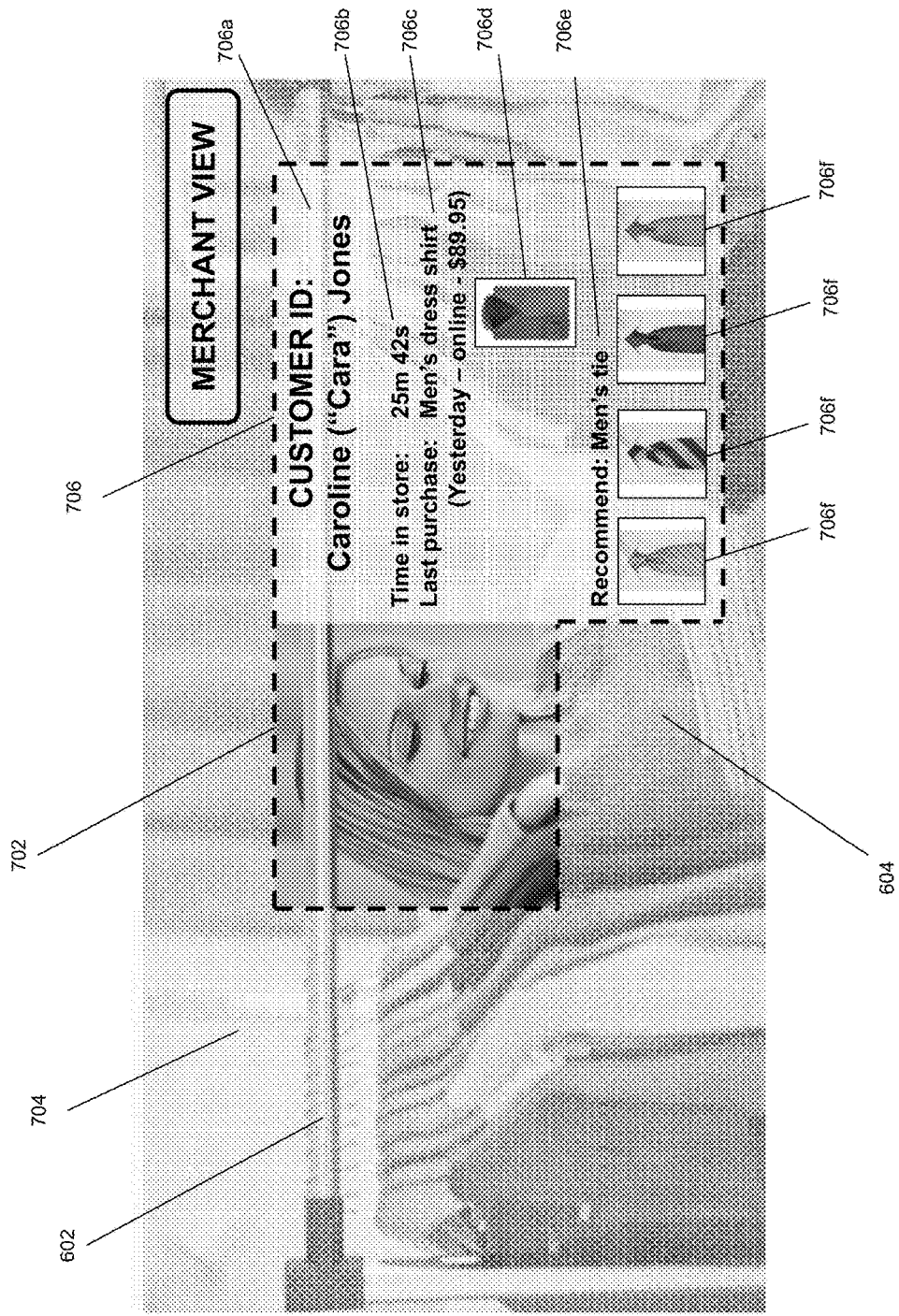
FIG. 7*b* is a screen shot illustrating an embodiment of a merchant-customer engagement information screen view of the customer of FIG. 6 through a wearable merchant device.
Figure 7C:
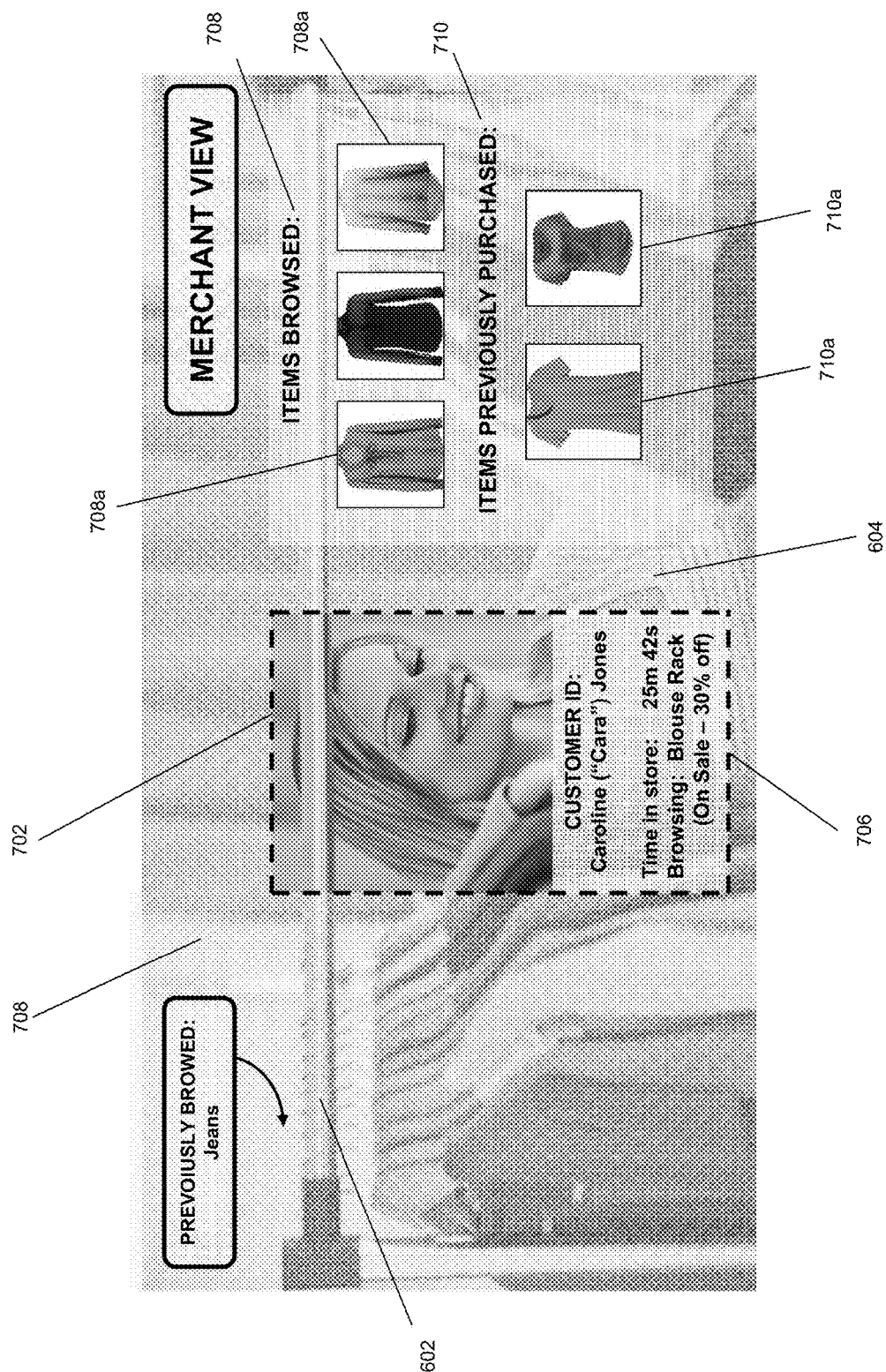
FIG. 7*c* is a screen shot illustrating an embodiment of a merchant-customer engagement information screen view of the customer of FIG. 6 through a wearable merchant device.
Figure 7D:
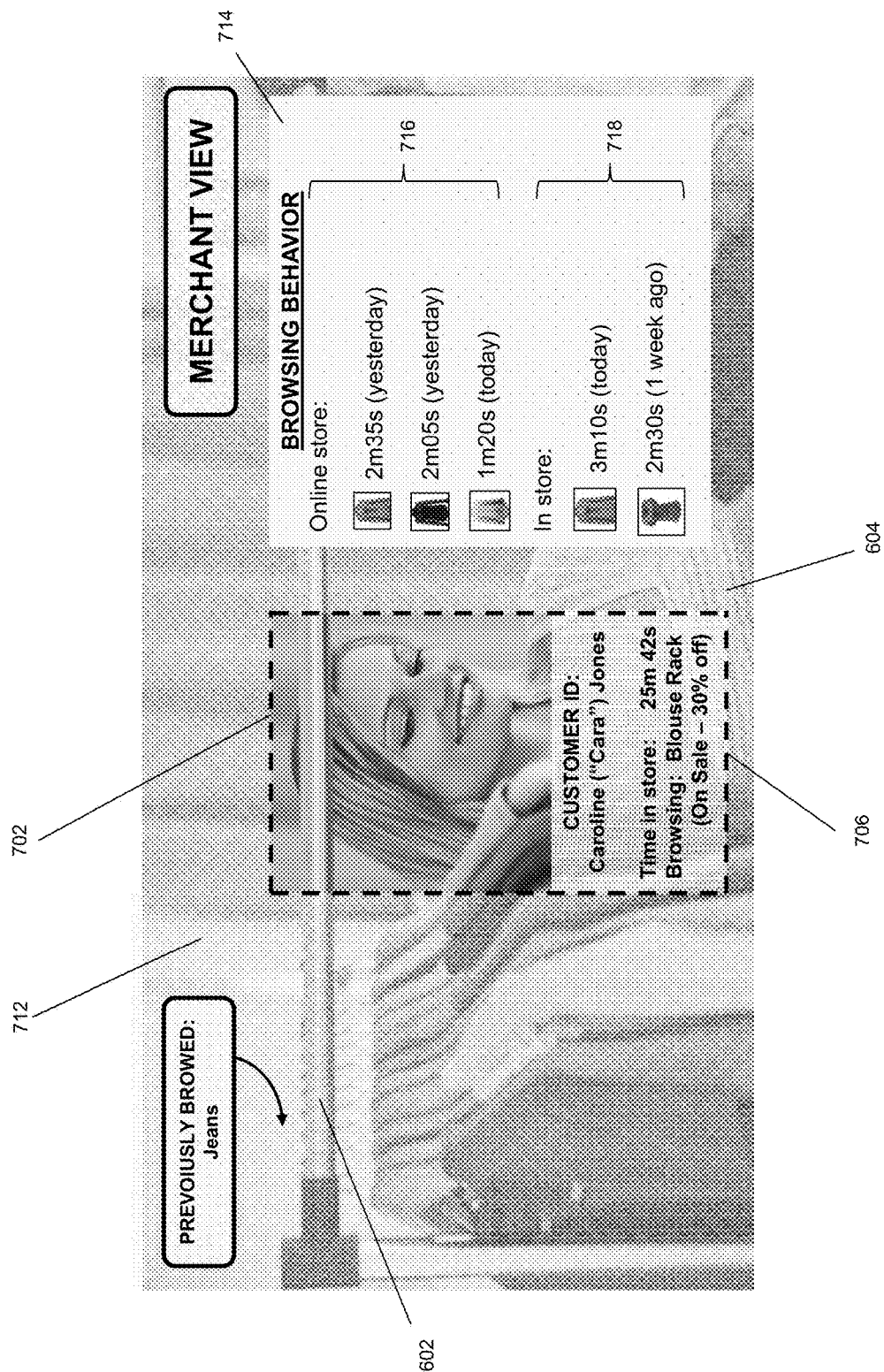
FIG. 7*d* is a screen shot illustrating an embodiment of a merchant-customer engagement information screen view of the customer of FIG. 6 through a wearable merchant device.

Thus, at block 116 of the method 100, the customer 604 is detected by a wearable mobile merchant device, and the method proceeds to block 118 where merchant-customer engagement information for the customer is provided on the wearable mobile merchant device. As discussed above, the detection of the customer by the wearable mobile merchant device at block 116 include the wearable mobile merchant device receiving some identifying information about the customer such as, for example, an image of the customer 604 that is used to detect the customer 604, a location of the customer device of the customer 604 that is used to detect the customer 306, communication of the identity of the customer 604 between the customer device of the customer 306 and the wearable mobile merchant device, etc. At block 118, that identifying information may be used by the system provider device 211 and matched against a customer identified in the merchant physical location 600 at block 102. As discussed above, at block 102 of the method 100, customers in the merchant physical location 600 are identified, and thus the identifying information for the customer detected at block 116 may be used by system provider device 211 at block 118 to allow any information collected about that customer 604 to be transmitted to the wearable mobile merchant device. FIGS. 7b, 7c, and 7d below illustrate just a few examples of merchant-customer engagement information that may be displayed on the wearable mobile merchant device at block 118.

Referring now to FIG. 7b, an embodiment of a merchant-customer engagement information screen 704 is illustrated. In the illustrated embodiment, the merchant-customer engagement information screen 704 is provided at block 118 of the method 100 after detecting the identified customer 604 at block 116. For example, the merchant wearing the wearable mobile merchant device approached the identified customer 604 from an aisle opposite the product area 602 from the customer 604, and the wearable mobile merchant device detected the identified customer 604 as discussed above. The system provider device 211 then sends back merchant-customer engagement information to the wearable mobile merchant device that may include any information tracked or retrieved for the customer 604 during the method 100. As illustrated in FIG. 7b, the wearable mobile merchant device then provides a merchant-customer engagement information window 706 adjacent the customer detection box 702 that includes a plurality of merchant-customer engagement information located adjacent the merchant's view of the customer 604 through the wearable mobile merchant device.

In the example illustrated in FIG. 7b, the merchant-customer engagement information displayed on the wearable mobile merchant device includes customer account information such as a customer identification 706a (e.g., "Caroline 'Cara' Jones" in the illustrated embodiment) that may have been retrieved at block 104 of the method 100 and that includes, in the illustrated example, a name and nickname of the customer 604. The merchant-customer engagement information also includes timing data 706b (e.g., "Time in store: 35 m 42 s") that may have been tracked at block 108 of the method 100 and that includes, in the illustrated example, a total amount of time the customer 604 has spent in the merchant physical location 600. The merchant-customer engagement information also includes purchase history information 706c and 706d (e.g., "Last purchase: Men's dress shirt (Yesterday—online—$89.95" along with an image of the product purchased) that may have been retrieved at block 112 of the method 100 or determined from information retrieved at block 112 and that includes, in the illustrated example, a description, price, location of purchase, time of purchase, and image of a recently purchased product. The merchant-customer engagement information also includes recommended product information 706e and 706f (e.g., "Recommend: Men's tie" along with images of recommended ties for the shirt associated with the purchase history information 706c and 706d) that may have been determined at block 114 of the method 100 and that includes, in the illustrated example, a description and a plurality of images of recommended products. Thus, the customer 604 (a woman) may have recently (e.g., the previous day) purchased a men's shirt online, and that information may be displayed to the merchant along with recommendations for ties that go with the previously purchased shirt.

Referring now to FIG. 7c, an embodiment of a merchant-customer engagement information screen 708 is illustrated. In the illustrated embodiment, the merchant-customer engagement information screen 708 may be selected for display by the merchant wearing the wearable mobile merchant device after the display of the merchant-customer engagement information screen 704, or may be presented by itself or prior to the display of the merchant-customer engagement information screen 704. For example, the merchant wearing the wearable mobile merchant device approached the customer 604 in the aisle across from the product area 602, the wearable mobile merchant device detected the customer 604 as discussed above and received and displayed the merchant-customer engagement information screen 704. The merchant-customer engagement system provider device then sends further merchant-customer engagement information to the wearable mobile merchant device that may include other information tracked or retrieved for the customer 604 during the method 100. As illustrated in FIG. 7c, the wearable mobile merchant device has minimized and moved the merchant-customer engagement information window 706 to a different location adjacent the customer detection box 702, and that merchant-customer engagement information window 706 includes some of the plurality of merchant-customer engagement information discussed above and positioned adjacent the merchant's view of the customer 706 through the wearable mobile merchant device. Furthermore, the further merchant-customer engagement information received by the wearable mobile merchant device may then be displayed adjacent the merchant's view of the customer 604.

In the example illustrated in FIG. 7c, the merchant-customer engagement information displayed on the wearable mobile merchant device includes product viewing information 708 and 708a (e.g., "ITEMS BROWSED" along with images of the items that the customer 604 has viewed I the merchant physical location 600) that may have been tracked at block 110 of the method 100. The merchant-customer engagement information also includes purchase history information 710 and 710a (e.g., "ITEMS PREVIOUSLY PURCHASED" along with images of products previously purchased by the customer 604) that may have been retrieved at block 112 of the method 100 or determined from information retrieved at block 112. Thus, the merchant may be presented with a plurality of a products that the customer 604 has viewed in their current visit to the merchant physical location 600, along with products previously purchased by that customer 604, and may use that information to recommend products to the customer 604 or help search for products for the customer 604 without recommending or searching for products the customer has already viewed or purchased.

Referring now to FIG. 7d, an embodiment of a merchant-customer engagement information screen 712 is illustrated. In the illustrated embodiment, the merchant-customer engagement information screen 712 may be selected for display by the merchant wearing the wearable mobile merchant device after the display of the merchant-customer engagement information screen 708, or may be presented by itself or prior to the display of the merchant-customer engagement information screen 708. For example, the merchant wearing the wearable mobile merchant device approached the customer 604 in the aisle across from the product area 602, the wearable mobile merchant device detected the customer 604 as discussed above and received and displayed the merchant-customer engagement information screen 708. The merchant-customer engagement system provider device then sends further merchant-customer engagement information to the wearable mobile merchant device that may include other information tracked or retrieved for the customer 604 during the method 100. As illustrated in FIG. 7d, the wearable mobile merchant device has continued to provide the minimized merchant-customer engagement information window 706 (relative to the provision of that window on the merchant-customer engagement information screen 704) adjacent the customer detection box 702, and that merchant-customer engagement information window 706 continues to include some of the plurality of merchant-customer engagement information discussed above and positioned adjacent the merchant's view of the customer 706 through the wearable mobile merchant device. Furthermore, the further merchant-customer engagement information received by the wearable mobile merchant device may then be displayed adjacent the merchant's view of the customer 604.

In the example illustrated in FIG. 7d, the merchant-customer engagement information displayed on the wearable mobile merchant device includes product viewing information 714 (e.g., "BROWSING BEHAVIOR") that may have been tracked at block 110 of the method 100. In the embodiment illustrated in FIG. 7d, the product viewing information 714 includes products viewed 716 by the customer 604 prior to or during their current visit to the merchant physical location 600 at a website (e.g., an "online store" of the merchant associated with the merchant physical location 600, an online store not associated with the merchant but that sells similar products as the merchant, etc.), as well as products viewed 718 by the customer 604 prior to or during to their current visit to the merchant physical location 600 (e.g., "In store"). The products viewed 716 at the website of the merchant and the products viewed 718 at the merchant physical location include, for each product viewed, an image of the product viewed, an amount of time the customer 604 spent viewing that product, and a date the customer 604 viewed the product. Therefore, the merchant website and merchant physical location 600 may provide for the tracking of product viewing information for customer actions on the website and at the merchant physical location 600, along with the association of that information with the customer 604 for retrieval and provision on the wearable mobile merchant device. The system provider device may operate to rank the products viewed by amount of time spent viewing, date viewed, based on products currently being viewed in the merchant physical location 600, and/or using a variety of other product ranking criteria known in the art. One of skill in the art in possession of the present disclosure will recognize that the longer a customer spends browsing a particular product, the higher then interest is in that product or similar products regardless of whether they actually purchase that product, and such information allows for targeting product recommendations by a merchant at the merchant physical location 600.

Thus, the merchant may be presented with product viewing information for the customer 604 that details the products the customer 604 has expressed interest in both previously and on their current visit to the merchant physical location 600. The presentation of the previous online product viewing actions, the current online product viewing actions, the previous in-store product viewing actions, and the current in-store product viewing actions by the customer 604 allow the merchant to make determinations about which products the customer 604 is most interested in (e.g., which items were browsed online and in-store; which products were browsed for the longest amount of time; etc.), and then make product recommendations for those or similar products to drive in-store purchasing by the customer 604. The provision of such product viewing activities may allow the merchant to reverse the "showrooming" behavior discussed above by, for example, capturing the customer's interest in products as expressed by product viewing activities, and then making product recommendations based on those activities. In addition, showrooming behavior may neutralized by, for example, determining current online product viewing activities of the customer 604 (e.g., the use of the customer device by the customer 604 while in the merchant physical location 600), retrieval of prices for similar products viewed online by the customer 604, and the possible discounting of product price or other leveraging of that information to drive a purchase by the customer from the merchant physical location 600.

Therefore, a variety of merchant-customer engagement information may be displayed on the wearable mobile merchant device such that the merchant may offer to help the customer 604 in determining products to purchase. One of skill in the art in possession of the present disclosure will recognize that a wide variety of merchant-customer engagement information not included in the example above may be beneficial in providing help to a customer, and will fall within the scope of the present disclosure. While the display of the merchant-customer engagement information adjacent the view of the customer 604 may provide several benefits including, for example, seamless merchant-customer engagement information lookup and use when the merchant is interacting with the customer 604, such wearable mobile merchant devices are not required in some embodiments of the systems and methods of the present disclosure, and a mobile merchant devices similar to the mobile merchant device 500 discussed above may provide merchant-customer engagement information screens similar to the merchant-customer engagement information screens 704 and 708.

Thus, systems and methods for providing merchant-customer engagement have been described that provide a merchant with a wide variety of information about a customer in a merchant physical location that allows that merchant to provide the most pertinent help to that customer. In specific embodiments, the merchant may wear a wearable mobile merchant device that displays merchant-customer engagement information adjacent the merchant's view of the customer so that the merchant-customer engagement information is quickly and easily referenced by the merchant while dealing with and helping that customer. Furthermore, merchant-customer engagement information may be determined from a variety of customer actions prior to the visit to the merchant physical location (e.g., previous purchases from the merchant or others) and/or a variety of customer actions in the merchant physical location (based on the tracking of the customer's movements through the merchant physical location, the products viewed by the customer in the merchant physical location, etc.) Providing the merchant with such pertinent information in such a manner allows the merchant to provide help to the customer that increases the chances of the customer making a purchase and returning to the merchant physical location to make further purchases, as the merchant-customer engagement information provides the merchant an intimate knowledge of the customer and allows help to be provided that is very specifically tailored to that customer.

Figure 8:
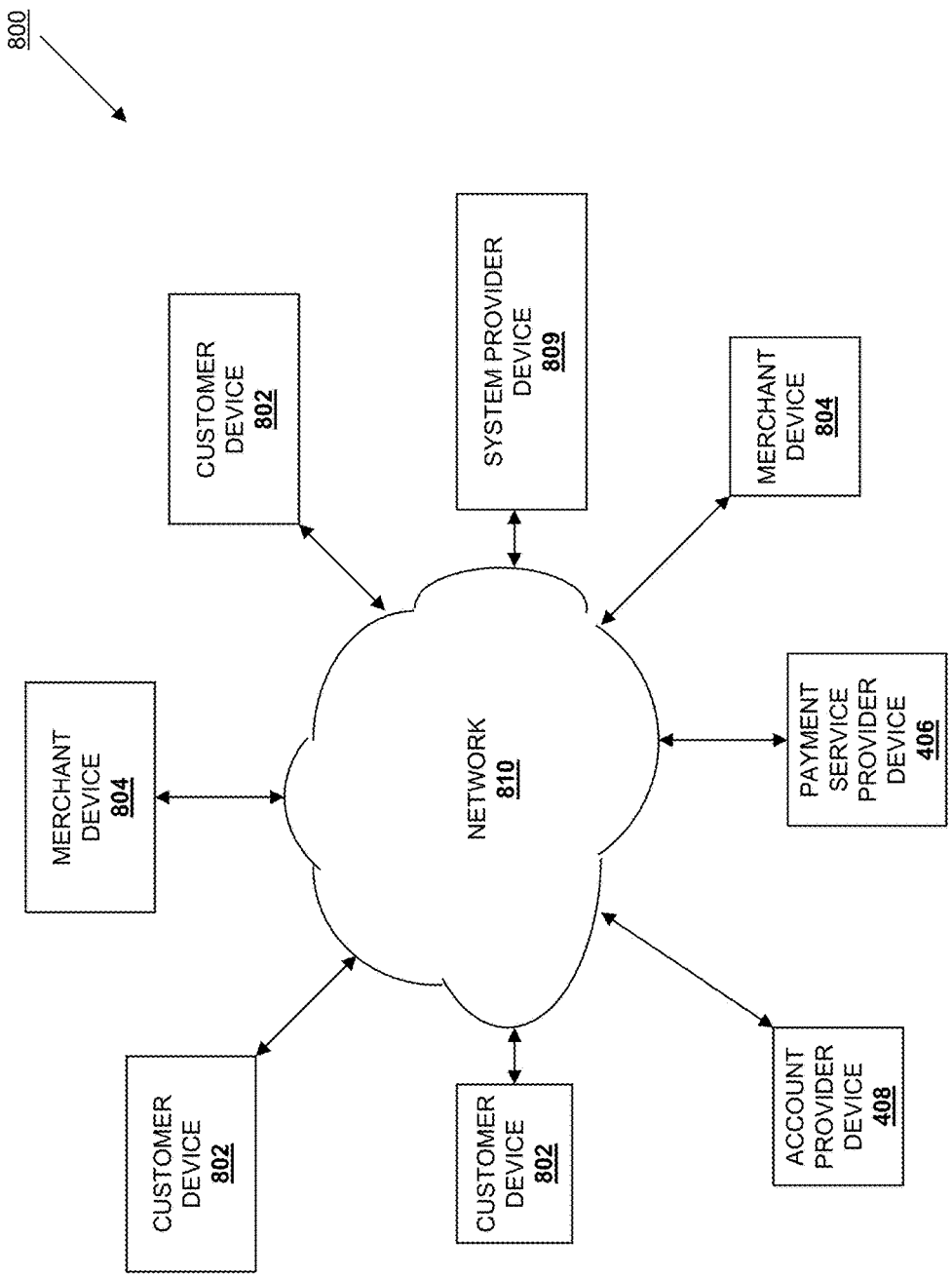
FIG. 8 is a schematic view illustrating an embodiment of a networked system.

Referring now to FIG. 8, an embodiment of a network-based system 800 for implementing one or more processes described herein is illustrated. As shown, network-based system 800 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 8 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 800 illustrated in FIG. 8 includes a plurality of customer devices 802, a plurality of merchant devices 804, a payment service provider device 806, an account holder device 808, and/or a system provider device 809 coupled together through a network 810. The customer devices 802 may be the customer devices discussed above and may be operated by the customers, discussed above. The merchant devices 804 may be the system provider device and/or mobile merchant devices discussed above and may be operated by the merchants discussed above. The payment service provider device 806 may be the payment service provider devices discussed above and may be operated by a payment service provider such as, for example, PayPal Inc. of San Jose, Calif. The account provider device 808 may be the account provider devices discussed above and may be operated by the account providers discussed above such as, for example, credit card account providers, bank account providers, savings account providers, and a variety of other account providers known in the art. The system provider device 809 may be the system provider devices discussed above and may be operated by the system providers discussed above.

The customer devices 802, merchant devices 804, payment service provider device 806, account provider device 808, and/or system provider device 809 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 800, and/or accessible over the network 810.

The network 810 may be implemented as a single network or a combination of multiple networks. For example, in various embodiments, the network 810 may include the Internet and/or one or more intranets, landline networks, wireless networks, and/or other appropriate types of networks.

The customer devices 802 may be implemented using any appropriate combination of hardware and/or software configured for wired and/or wireless communication over network 810. For example, in one embodiment, the customer devices 802 may be implemented as a personal computer of a customer in communication with the Internet. In other embodiments, the customer devices 802 may be a smart phone, personal digital assistant (PDA), laptop computer, and/or other types of computing devices.

The customer devices 802 may include one or more browser applications which may be used, for example, to provide a convenient interface to permit the customer to browse information available over the network 810. For example, in one embodiment, the browser application may be implemented as a web browser configured to view information available over the Internet.

The customer devices 802 may also include one or more toolbar applications which may be used, for example, to provide user-side processing for performing desired tasks in response to operations selected by the customer. In one embodiment, the toolbar application may display a user interface in connection with the browser application.

The customer devices 802 may further include other applications as may be desired in particular embodiments to provide desired features to the customer devices 802. In particular, the other applications may include a payment application for payments assisted by a payment service provider through the payment service provider device 806. The other applications may also include security applications for implementing user-side security features, programmatic user applications for interfacing with appropriate application programming interfaces (APIs) over the network 810, or other types of applications. Email and/or text applications may also be included, which allow the customer to send and receive emails and/or text messages through the network 810. The customer devices 802 include one or more user and/or device identifiers which may be implemented, for example, as operating system registry entries, cookies associated with the browser application, identifiers associated with hardware of the customer devices 802, or other appropriate identifiers, such as a phone number. In one embodiment, the customer identifier may be used by the merchant devices 804, payment service provider device 806, account provider device 808, and/or system provider device 809 to associate the customer with a particular account as further described herein.

The merchant devices 804 may be maintained, for example, by a conventional or on-line merchant, conventional or digital goods seller, individual seller, and/or application developer offering various products and/or services in exchange for payment to be received conventionally or over the network 810. In this regard, the merchant devices 804 may include a database identifying available products and/or services (e.g., collectively referred to as items) which may be made available for viewing and purchase by the customer. The merchant devices 804 also include a checkout application which may be configured to facilitate the purchase by the payer of items. The checkout application may be configured to accept payment information from the customer through the customer devices 802, the account provider through the account provider device 808, and/or from the payment service provider through the payment service provider device 806 over the network 810.

Figure 9:
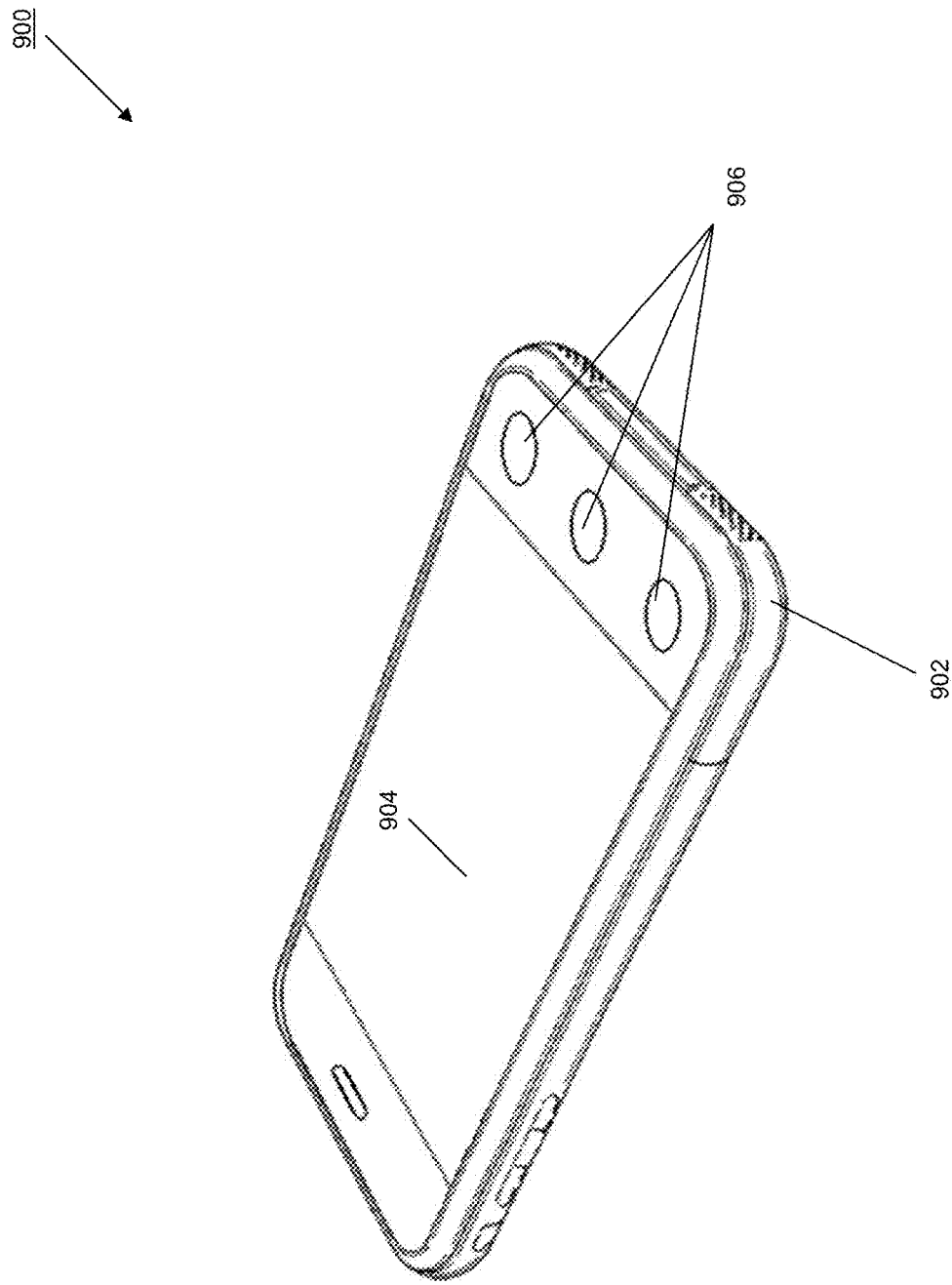
FIG. 9 is a perspective view illustrating an embodiment of a customer device.

Referring now to FIG. 9, an embodiment of a customer device 900 is illustrated. The customer device 900 may be any of the customer devices discussed above. The customer device 900 includes a chassis 902 having a display 904 and an input device including the display 904 and a plurality of input buttons 906. One of skill in the art will recognize that the customer device 900 is a portable or mobile phone including a touch screen input device and a plurality of input buttons that allow the functionality discussed above with reference to the method 100. However, a variety of other portable/mobile customer devices and/or desktop customer devices may be used in the method 100 without departing from the scope of the present disclosure.

Figure 10:
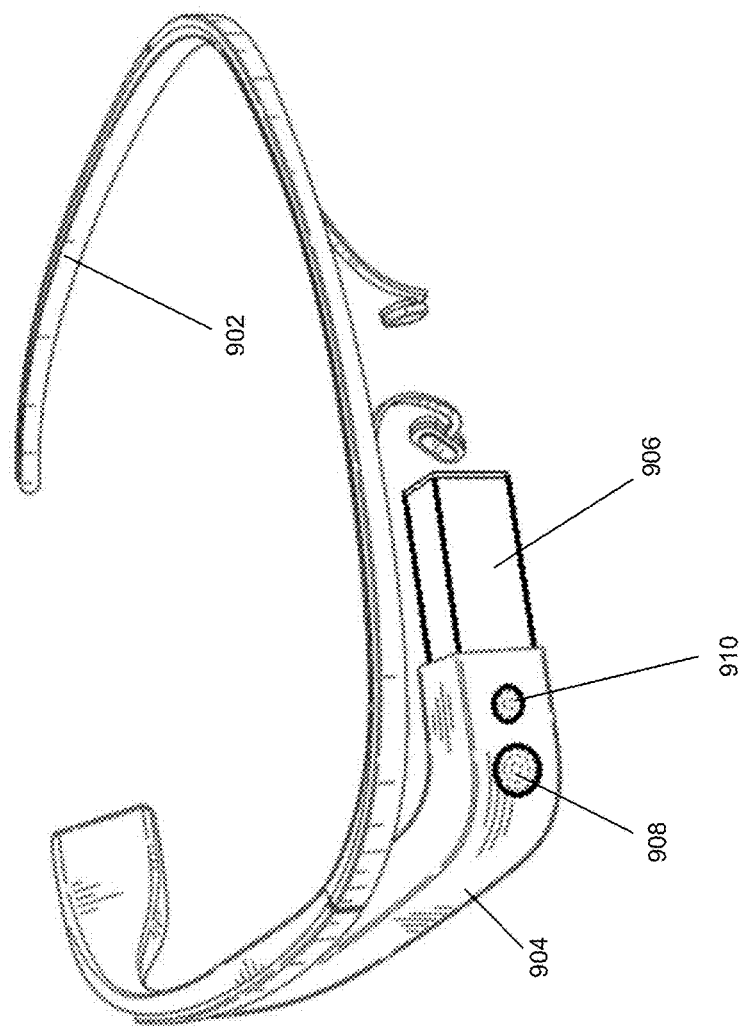
FIG. 10 is a perspective view illustrating an embodiment of a wearable merchant device.

Referring now to FIG. 10, an embodiment of a wearable mobile merchant device 1000 is illustrated. The wearable mobile merchant device 1000 may be any of the wearable mobile merchant devices discussed above. The wearable mobile merchant device 1000 includes a wearable frame 902 that, in the illustrated embodiment, is similar to an eyeglass frame. A computing chassis 904 is affixed to the wearable frame 902 and includes a transparent display 906 that extends from the computing chassis 904 and into a field of view of a user of the wearable mobile merchant device 1000. The computing chassis 904 also includes a microphone 908 and a camera 910. One of skill in the art will recognize that the wearable mobile merchant device 1000 is Google Glass® type wearable mobile device available from Google, Inc. of Mountain View, Calif. that allow the functionality discussed above with reference to the method 100. However, a variety of other wearable portable/mobile devices may be used in the method 100 without departing from the scope of the present disclosure.

Figure 11:
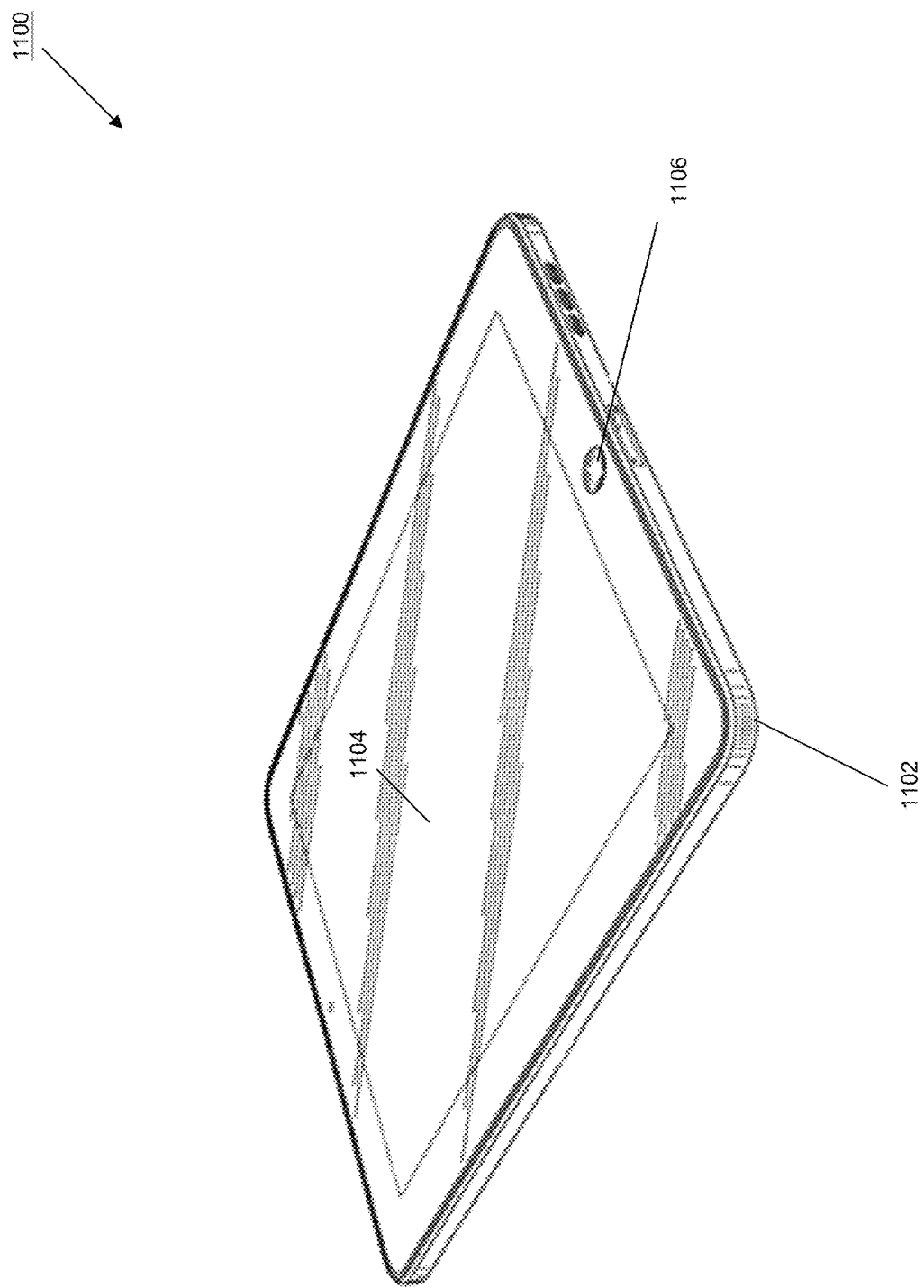
FIG. 11 is a perspective view illustrating an embodiment of a mobile merchant device.

Referring now to FIG. 11, an embodiment of a mobile merchant device 1100 is illustrated. The mobile merchant device 11000 may be any of the mobile merchant devices discussed above. The mobile merchant device 1100 includes a chassis 1102 having a display 1104 and an input device including the display 1104 and an input button 1106. One of skill in the art will recognize that the mobile merchant device 1100 is a portable or mobile tablet computer including a touch screen input device and input button that allow the functionality discussed above with reference to the method 100. However, a variety of other portable/mobile devices and/or desktop devices may be used in the method 100 without departing from the scope of the present disclosure.

Figure 12:
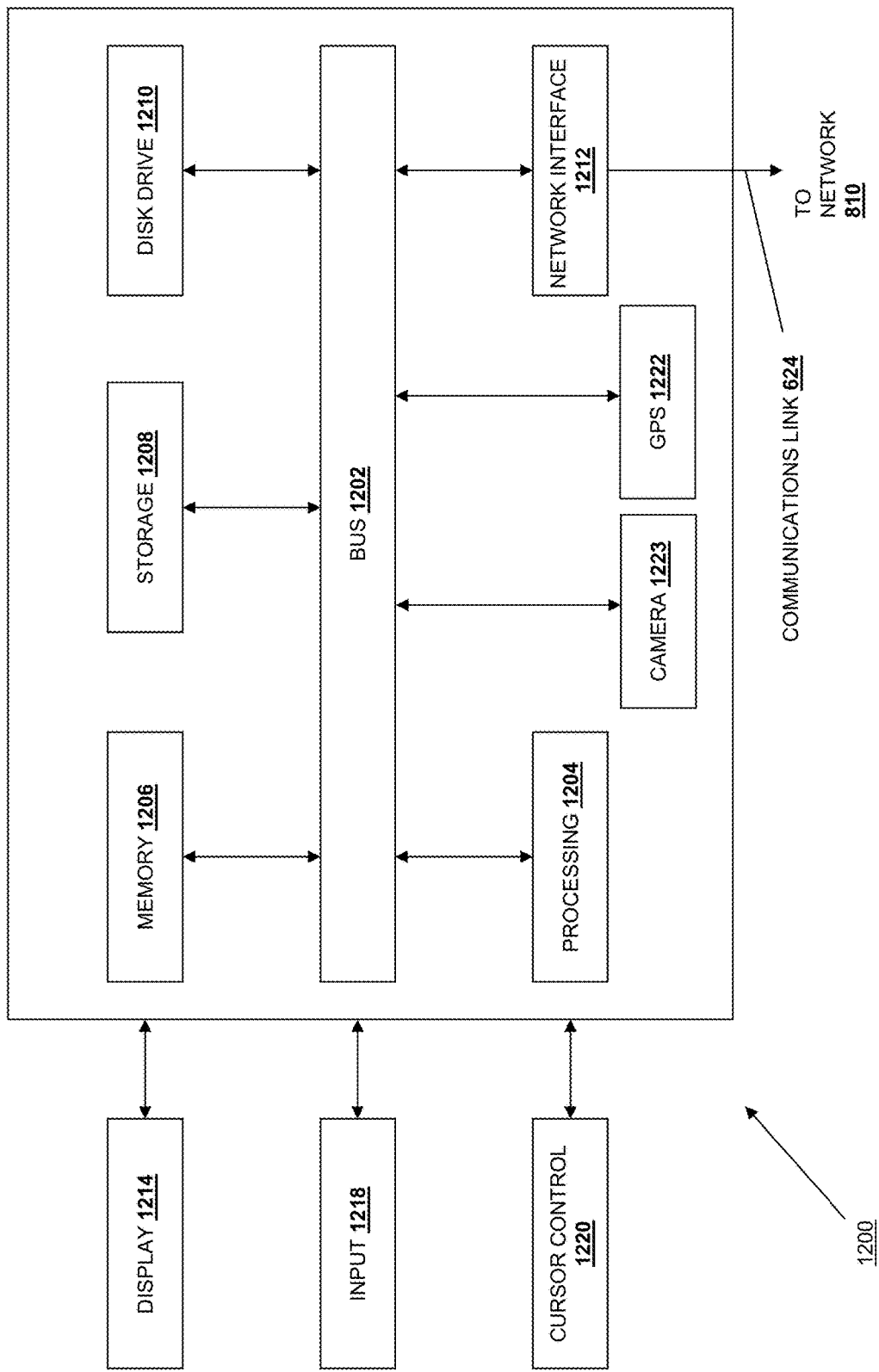
FIG. 12 is a schematic view illustrating an embodiment of a computer system.

Referring now to FIG. 12, an embodiment of a computer system 1200 suitable for implementing, for example, the customer devices discussed above, the merchant devices discussed above, the payment service provider devices discussed above, the account provider devices discussed above, and/or the system provider devices discussed above, is illustrated. It should be appreciated that other devices utilized by customers, merchants, payment service providers, account providers, and/or system providers in the merchant-customer engagement system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 808 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), a location determination component 1222 (e.g., a Global Positioning System (GPS) device as illustrated, a cell tower triangulation device, and/or a variety of other location determination devices known in the art), and/or a camera component 1223 In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the customer devices, the merchant devices, the payment service provider devices, the account provider devices, and/or the system provider devices. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 810 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
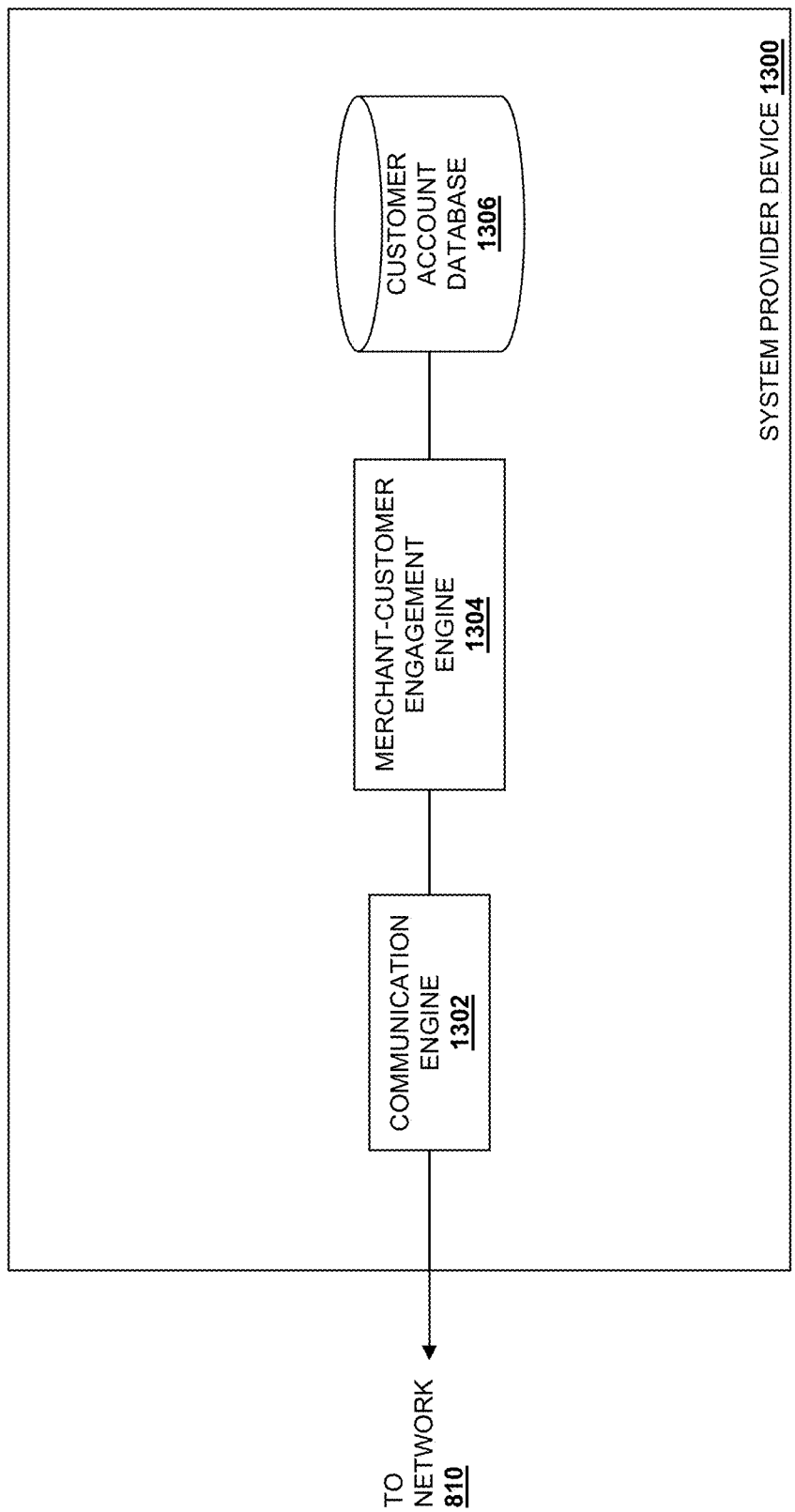
FIG. 13 is a schematic view illustrating an embodiment of a system provider device.

Referring now to FIG. 13, an embodiment of a system provider device 1300 is illustrated. In an embodiment, the device 1300 may be the system provider devices discussed above, the mobile merchant devices discussed above, and/or combinations thereof. The device 1300 includes a communication engine 1302 that is coupled to the network 810 and to user help engine 1304 that is coupled to a customer account database 1306. The communication engine 1302 may be software or instructions stored on one or more computer-readable mediums that allows the device 1300 to send and receive information over the network 810. The merchant-customer engagement engine 1304 may be software or instructions stored on a computer-readable medium that is operable to identify customers in a merchant physical location, retrieve and/or create customer accounts for identified customers, track customer locations within the merchant physical location, track timing data for identified customers, track products viewed for identified customers, retrieve purchase histories for identified customers, determine product recommendations for identified customers, detect customer (e.g., via a mobile merchant device), display merchant-customer engagement information (e.g., on a mobile merchant device), and provide any of the other functionality that is discussed above. While the database 1306 has been illustrated as located in the system provider device 1300, one of skill in the art will recognize that it may be connected to the merchant-customer engagement engine 1304 through the network 810 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory storing a plurality of customer records and product location data associated with a merchant physical location; and
    one or more hardware processors coupled to the non-transitory memory and configured to execute instructions to cause the system to perform operations comprising:
        detecting, via communication through a network, a first customer device that is located in the merchant physical location;
        identifying, in the non-transitory memory and in response to detecting the first customer device in the merchant physical location, a first customer record that is included in the plurality of customer records and that corresponds to a first customer that is associated with the first customer device, and retrieving first customer account information for the first customer from the first customer record;
        tracking, via communication with the first customer device through the network, the location of the first customer device within the merchant physical location as the first customer device moves through the merchant physical location;
        determining, based at least on the tracking of the location of the first customer device within the merchant physical location and timing data captured during that tracking, that the first customer has viewed a first product type in the merchant physical location that is identified by the product location data in the merchant physical location;
        receiving, from a merchant mobile device that is different than the first customer device, at least one image;
        analyzing the at least one image received from the merchant mobile device to recognize the first customer included in the at least one image; and
        generating and providing, for display on the mobile merchant device and adjacent the first customer included in the at least one image, a graphical user interface that include a graphical element displaying first product type information that identifies the first product type.

2. The system of claim 1, wherein the first customer account information includes purchase information corresponding to at least one previous purchase made by the first customer, and the operations further comprise:
    determining, based at least on the tracking of the location of the first customer device within the merchant physical location, a current location of the first customer device in the merchant physical location;
    analyzing, based on the current location of the first customer in the merchant physical location, the purchase information to identify a first previous purchase made by the first customer;
    retrieving, from the database, first previous purchase information corresponding to the first previous purchase; and
    providing, for display on the mobile merchant device and adjacent the first customer included in the at least one image, the first previous purchase information.

3. The system of claim 2, wherein the first previous purchase made by the first customer is an online purchase.

4. The system of claim 1, wherein the determining that the first customer has viewed the first product type in the merchant physical location based at least on the tracking of the location of the first customer device within the merchant physical location and timing data captured during that tracking further includes:
    tracking of the location of the first customer device within the merchant physical location and timing data captured during that tracking indicates that the first customer device was located in an area of the merchant physical location that is associated with the first product type for a minimum time period.

5. The system of claim 4, wherein the operations further comprise:
    providing, for display on the mobile merchant device and adjacent the first customer included in the at least one image, a total amount of time the first customer device was located in the area of the merchant physical location that is associated with the first product.

6. The system of claim 1, wherein the operations further comprise:
    identifying, based on the first product, recommended product information for at least one recommended product; and
    providing, for display on the mobile merchant device and adjacent the first customer included in the at least one image, the recommended product information.

7. A method comprising:
    detecting, by a system provider device via communication through a network, a first customer device that is located in a physical location;
    identifying, by the system provider device in a database and in response to detecting the first customer device in the physical location, a first customer record that corresponds to a first customer that is associated with the first customer device, and retrieving first customer account information for the first customer from the first customer record;
    tracking, by the system provider device via communication with the first customer device through the network the location of the first customer within in the physical location as the first customer device moves through the physical location;

determining, by the system provider device based at least on the tracking of the location of the first customer device within the merchant physical location and timing data captured during that tracking, that the first customer has viewed a first product type in the merchant physical location that is identified by the product location data in the merchant physical location;

receiving, by the system provider device from a camera that is not included on the first customer device, at least one image;

in response to receiving an image from a mobile merchant device that is different from the first customer device, analyzing, by the system provider device, the at least one image to recognize the first customer included in the at least one image; and in response to identifying that the first customer is included in the image, generating and providing, by the system provider device for display on a display device adjacent the first customer included in the at least one image, a graphical user interface that include graphical element displaying product type information that identifies the first product type.

8. The method of claim 7, further comprising:

determining, by the system provider device based at least on the tracking of the location of the first customer device within the merchant physical location, a current location of the first customer device in the merchant physical location;

analyzing, by the system provider device based on the current location of the first customer in the merchant physical location, purchase information stored in the database to identify a first previous purchase made by the first customer;

retrieving, by the system provider device from the database, first previous purchase information corresponding to the first previous purchase; and providing, by the system provider device for display on the display device and adjacent the first customer included in the at least one image, the first previous purchase information.

9. The method of claim 8, wherein the first previous purchase made by the first customer is an online purchase.

10. The method of claim 7, wherein the determining that the first customer has viewed the first product type in the merchant physical location based at least on the tracking of the location of the first customer device within the merchant physical location and timing data captured during that tracking further includes:

tracking of the location of the first customer device within the merchant physical location and timing data captured during that tracking indicates that the first customer device was located in an area of the physical location that is associated with the first product type for a minimum time period.

11. The method of claim 7, further comprising:

providing, by the system provider device for display on the display device and adjacent the first customer included in the at least one image, a total amount of time the first customer device was located in the area of the physical location that is associated with the first product.

12. The method of claim 7, further comprising:

identifying, based on the first product, recommended product information for at least one recommended product; and providing, by the system provider device for display on the display device and adjacent the first customer included in the at least one image, the recommended product information.

13. The method of claim 7, wherein the tracking the first customer within the physical location includes receiving location information collected from the first customer device by at least one customer device location sensor that is located in the physical location.

14. A non-transitory machine-readable medium having stored thereon machine-readable instructions executable to cause a machine to perform operations comprising:

detecting, via communication through a network, a first customer that is located in a merchant physical location;

identifying, in a database and in response to detecting the first customer device in the merchant physical location, a first customer record that corresponds to a first customer that is associated with the first customer device, and retrieving first customer account information first the first customer from the first customer record;

tracking, by the system provider device via communication with the first customer device through the network the location of the first customer within in the physical location as the first customer device moves through the physical location;

determining, by the system provider device based at least on the tracking of the location of the first customer device within the merchant physical location and timing data captured during that tracking, that the first customer has viewed a first product type in the merchant physical location that is identified by the product location data in the merchant physical location;

receiving, from a merchant mobile device that is different than the first customer device, at least one image;

analyzing the at least one image to recognize the first customer included in the at least one image; and generating and providing, for display on the mobile merchant device adjacent the first customer included in the at least one image, a graphical user interface that include a graphical element displaying first product type information that identifies the first product type.

15. The non-transitory machine-readable medium of claim 14, wherein the operations further comprise:

determining, based at least on the tracking of the location of the first customer device within the merchant physical location, a current location of the first customer device in the merchant physical location;

analyzing, based on the current location of the first customer in the merchant physical location, purchase information stored in the database to identify a first previous purchase made by the first customer;

retrieving, from the database, first previous purchase information corresponding to the first previous purchase; and providing, for display on the mobile merchant device and adjacent the first customer included in the at least one image, the first previous purchase information.

16. The non-transitory machine-readable medium of claim 15, wherein the first previous purchase made by the customer is an online purchase.

17. The non-transitory machine-readable medium of claim 14, wherein the determining that the first customer has viewed the first product type in the merchant physical location based at least on the tracking of the location of the first customer device within the merchant physical location and timing data captured during that tracking further includes:

tracking of the location of the first customer device within the merchant physical location and timing data captured during that tracking indicates that the first customer device was located in an area of the merchant physical location that is associated with the first product type for a minimum time period.

18. The non-transitory machine-readable medium of claim 14, wherein the operations further comprise:

and adjacent the first customer included in the at least one image, a total amount of time the first customer device was located in the area of the physical location that is associated with the first product.

19. The non-transitory machine-readable medium of claim 14, wherein the operations further comprise:

identifying, based on the first product, recommended product information for at least one recommended product; and providing, for display on the mobile merchant device and adjacent the first customer included in the at least one image, the recommended product information.

20. The non-transitory machine-readable medium of claim 14, wherein the tracking the first customer within the merchant physical location includes receiving location information collected from the first customer device by at least one customer device location sensor that is located in the physical location.

\* \* \* \* \*